(12) United States Patent
Schlagman et al.

(10) Patent No.: US 11,760,402 B2
(45) Date of Patent: Sep. 19, 2023

(54) PUSH CHAIR

(71) Applicant: JIJIBABA LIMITED, London (GB)

(72) Inventors: Richard Schlagman, Locarno (CH); Björn Dahlström, Saltsjö-Duvnäs (SE)

(73) Assignee: JIJIBABA LIMITED, London (GB)

( * ) Notice: Subject to any disclaimer, the term of this patent is extended or adjusted under 35 U.S.C. 154(b) by 0 days.

(21) Appl. No.: 17/277,445

(22) PCT Filed: Sep. 18, 2019

(86) PCT No.: PCT/IB2019/000770
§ 371 (c)(1),
(2) Date: Mar. 18, 2021

(87) PCT Pub. No.: WO2020/058753
PCT Pub. Date: Mar. 26, 2020

(65) Prior Publication Data
US 2021/0347400 A1    Nov. 11, 2021

(30) Foreign Application Priority Data

Sep. 18, 2018 (GB) .................................. 1815203
Dec. 21, 2018 (GB) .................................. 1821001

(51) Int. Cl.
*B62B 7/06* (2006.01)
(52) U.S. Cl.
CPC .......... *B62B 7/062* (2013.01); *B62B 2205/18* (2013.01)
(58) Field of Classification Search
CPC ............... B62B 7/062; B62B 2205/18; B62B 2205/003; B62B 2205/02; B62B 7/086
See application file for complete search history.

(56) References Cited

U.S. PATENT DOCUMENTS

| 3,648,795 A | * | 3/1972 | Moulton | B62K 5/027 |
| | | | | 180/65.6 |
| 7,401,803 B1 | * | 7/2008 | Lai | B62B 9/245 |
| | | | | 280/47.38 |
| 7,481,443 B2 | * | 1/2009 | Shim | B62K 13/04 |
| | | | | 280/282 |

(Continued)

FOREIGN PATENT DOCUMENTS

| CN | 101104414 A | * | 1/2008 |
| CN | 101104414 A | | 1/2008 |

(Continued)

OTHER PUBLICATIONS

Translated CN-101104414-A (Year: 2022).*

(Continued)

*Primary Examiner* — James A Shriver, II
*Assistant Examiner* — Ian Bryce Shelton
(74) *Attorney, Agent, or Firm* — CANTOR COLBURN LLP

(57) ABSTRACT

A foldable push chair comprises a central body portion extending across the push chair and defining a central axis, the central axis extending substantially perpendicularly to the normal direction of travel of the push chair, a handle assembly connected to the central body and extending therefrom, at least three wheel supporting legs are rotatable around the central axis and extending from the central body, in the unfolded state one or more wheel supporting legs extend in a forward direction from the central axis and one or more wheel supporting legs extend in a rearward direction from the central axis; the forward and rearward extending legs are coupled together such that they rotate in opposite directions around the central axis during a folding or unfolding operation.

20 Claims, 25 Drawing Sheets

(56) References Cited

U.S. PATENT DOCUMENTS

| | | |
|---|---|---|
| 8,499,898 B2 | 8/2013 | Thorne |
| 10,167,008 B1 * | 1/2019 | Yang ................. B62B 7/086 |
| 10,926,825 B2 * | 2/2021 | Neugebauer ........... B62B 9/005 |
| 2004/0183275 A1 | 9/2004 | Chen |
| 2006/0214395 A1 | 9/2006 | Ageneau |
| 2006/0267303 A1 | 11/2006 | Golias |
| 2007/0205576 A1 * | 9/2007 | Lynch .................. B62K 5/02 280/282 |
| 2008/0088116 A1 * | 4/2008 | Den Boer ............. B62B 7/142 280/650 |
| 2010/0025968 A1 | 2/2010 | Fritz et al. |
| 2011/0221169 A1 | 9/2011 | Karremans et al. |
| 2012/0112435 A1 | 5/2012 | Kobayashi |
| 2013/0147162 A1 | 6/2013 | Hsu |
| 2013/0234418 A1 | 9/2013 | Reimers et al. |
| 2014/0116608 A1 * | 5/2014 | Sato .................. F16D 3/68 156/245 |
| 2014/0125038 A1 | 5/2014 | Lin |
| 2014/0312599 A1 | 10/2014 | Millman-Wood |
| 2015/0307120 A1 | 10/2015 | Sundberg et al. |
| 2018/0001920 A1 | 1/2018 | Li et al. |
| 2019/0111989 A1 * | 4/2019 | Neugebauer .......... B62K 5/027 |
| 2019/0256120 A1 | 8/2019 | Oakes |
| 2021/0052957 A1 * | 2/2021 | Payne ................ B62B 5/0433 |

FOREIGN PATENT DOCUMENTS

| | | | | |
|---|---|---|---|---|
| CN | 103359146 B | 6/2016 | | |
| CN | 105946952 A | 9/2016 | | |
| CN | 105946952 A * | 9/2016 | | |
| CN | 106347444 A * | 1/2017 | | |
| CN | 106891972 A | 6/2017 | | |
| CN | 107226121 A * | 10/2017 | | |
| CN | 206968743 U * | 2/2018 | | |
| CN | 107757688 A * | 3/2018 | | |
| CN | 207328549 U * | 5/2018 | | |
| CN | 108407875 A | 8/2018 | | |
| DE | 3147657 A1 | 6/1983 | | |
| EP | 2368784 A1 | 9/2011 | | |
| EP | 3300990 A1 | 4/2018 | | |
| GB | 2431381 A | 4/2007 | | |
| GB | 2431381 A * | 4/2007 | ............. | B62B 7/06 |
| GB | 2507507 A * | 5/2014 | ............. | B62B 7/08 |
| WO | WO-2006031115 A2 * | 3/2006 | ............. | B62B 7/062 |
| WO | 2010028235 A1 | 3/2010 | | |
| WO | 2015093999 A1 | 6/2015 | | |
| WO | WO-2016208060 A1 * | 12/2016 | ............. | B62B 3/02 |
| WO | WO-2017164928 A1 * | 9/2017 | | |

OTHER PUBLICATIONS

Translated CN-105946952-A (Year: 2022).*
International Search Report for International Application No. PCT/IB2019/000770 International Filing date Sep. 18, 2019; Report dated Feb. 3, 2020; 5 pages.
Written Opinion for International Application No. PCT/IB2019/000770 International Filing date Sep. 18, 2019; Report dated Feb. 3, 2020; 6 pages.

* cited by examiner

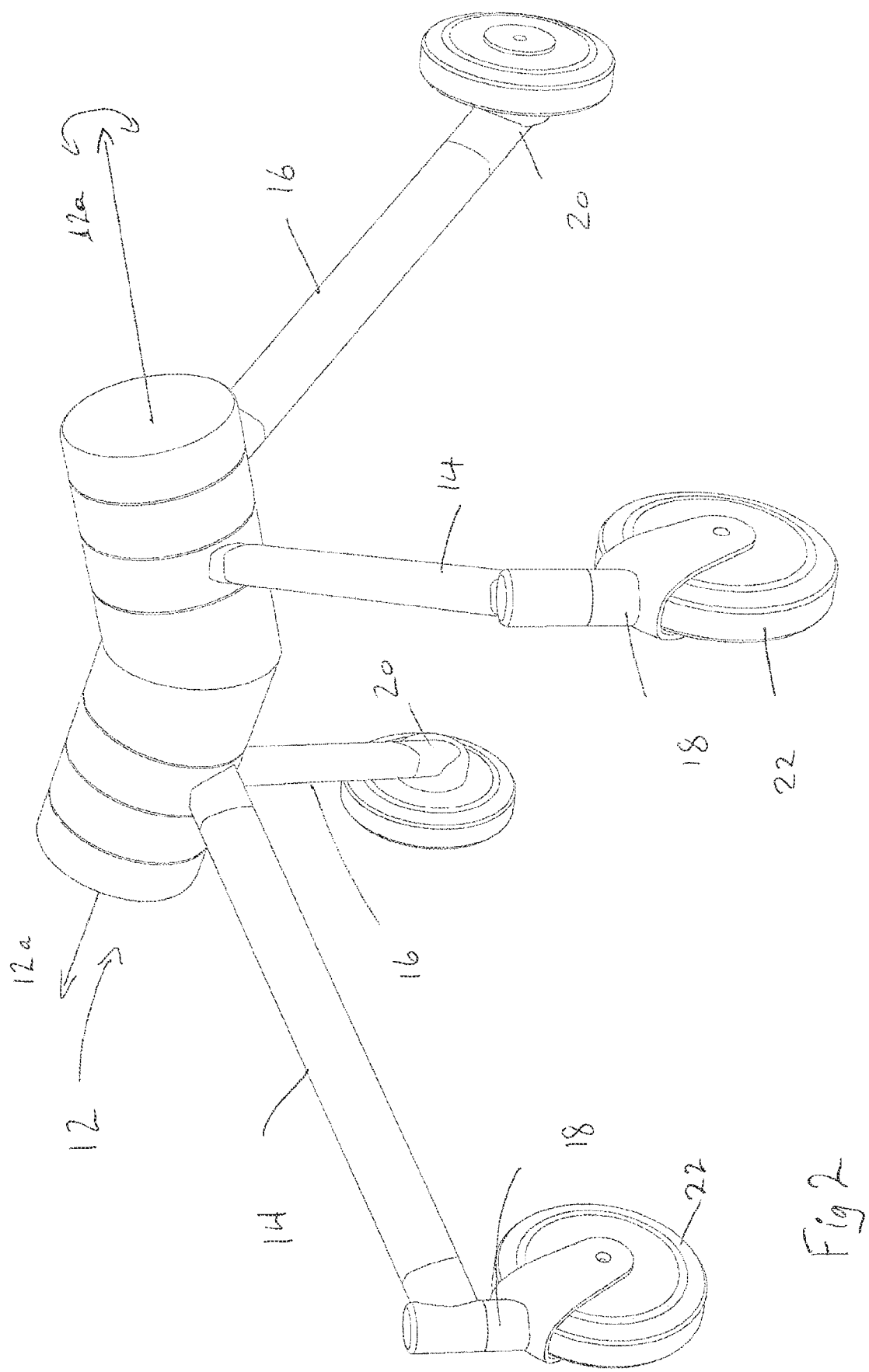

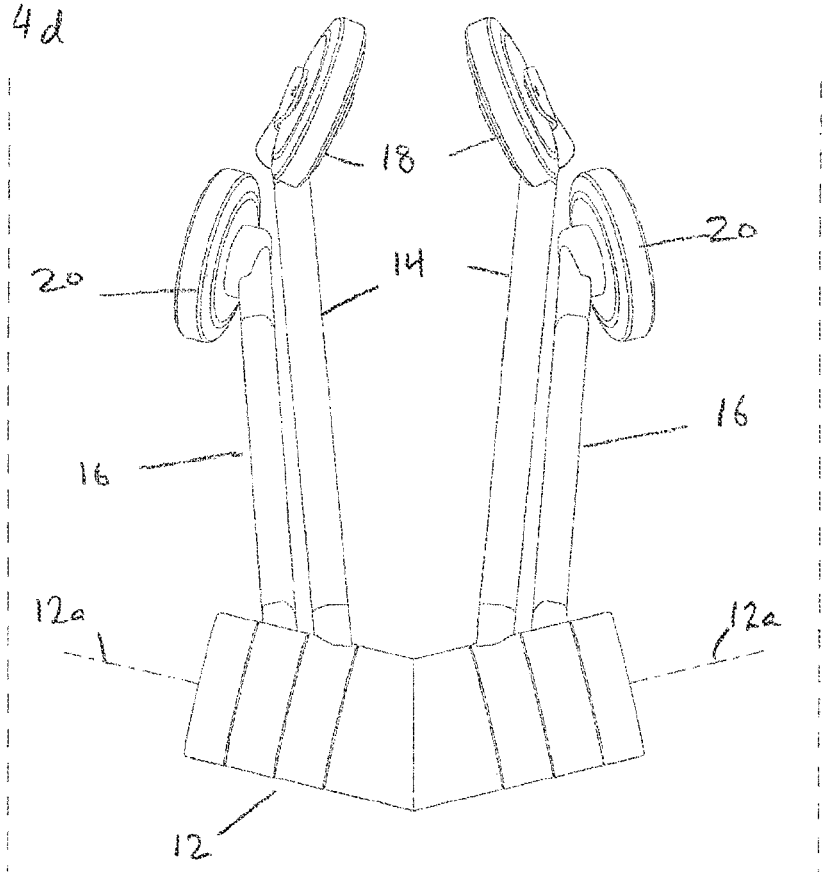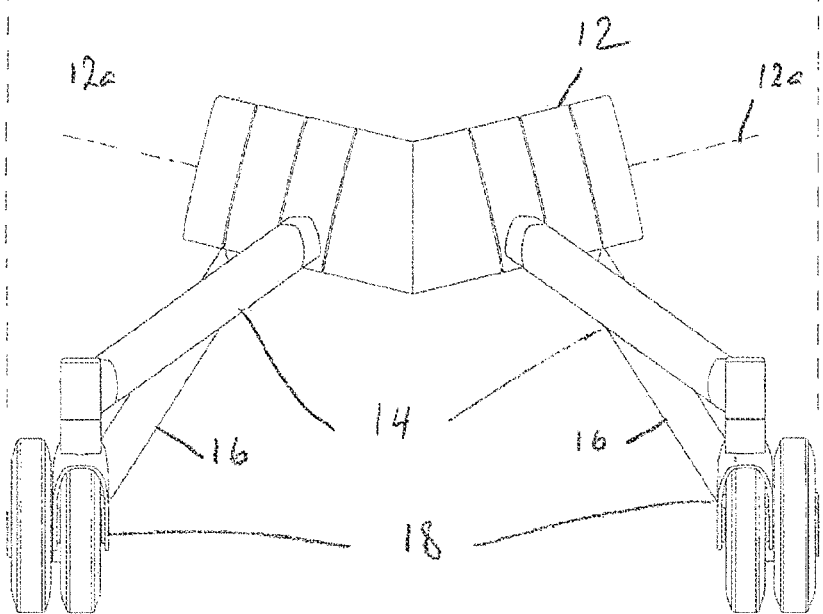

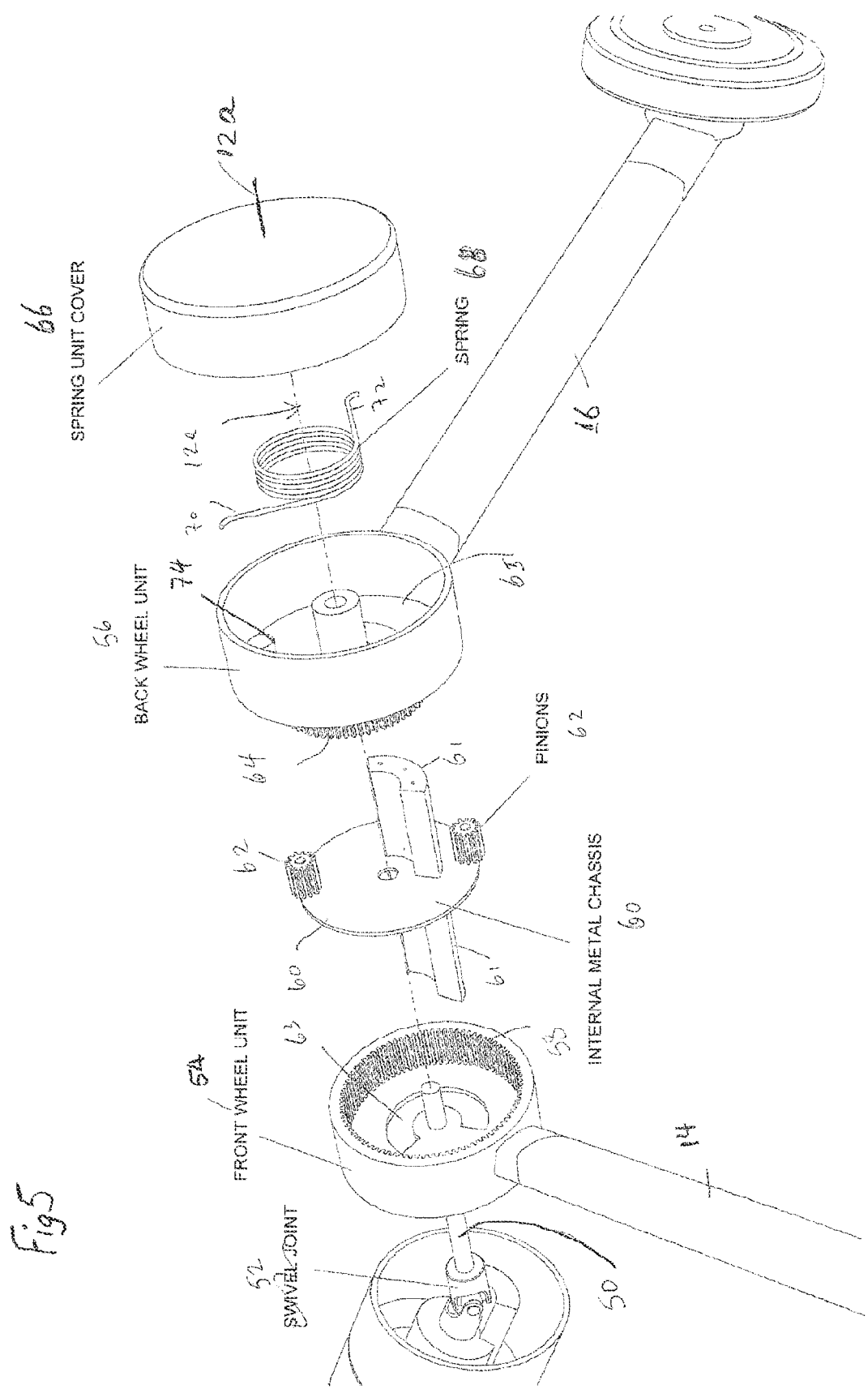

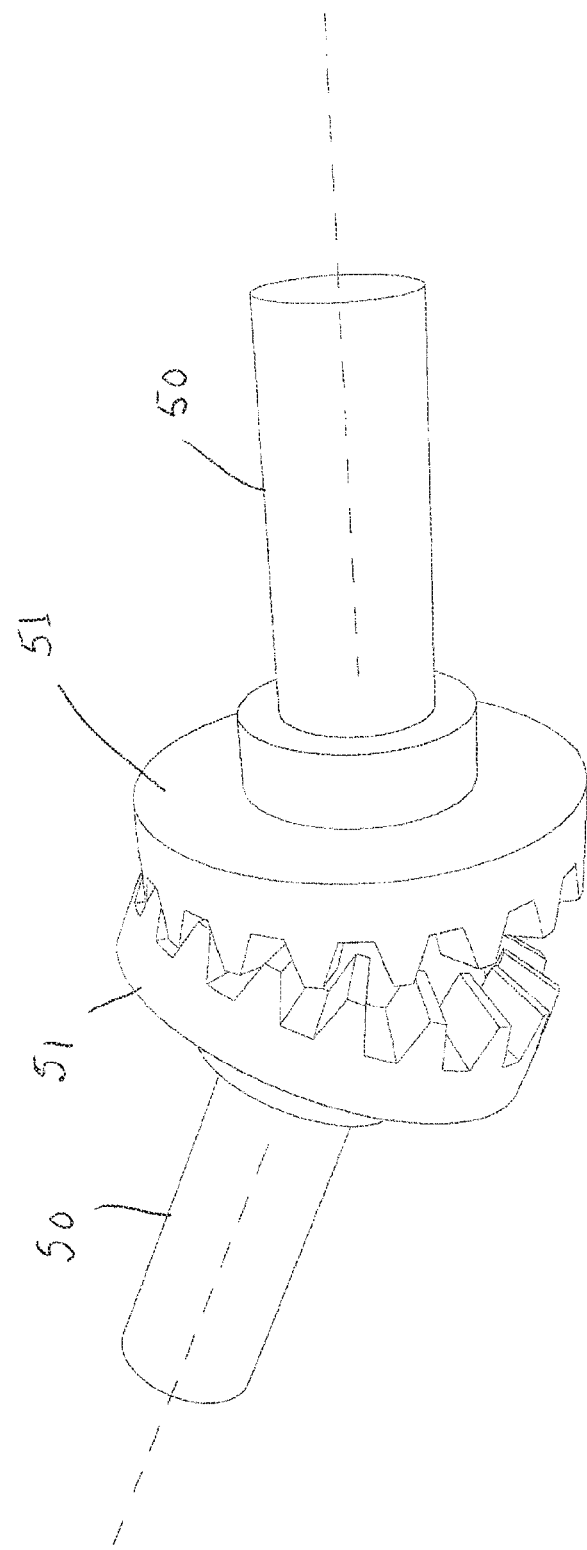

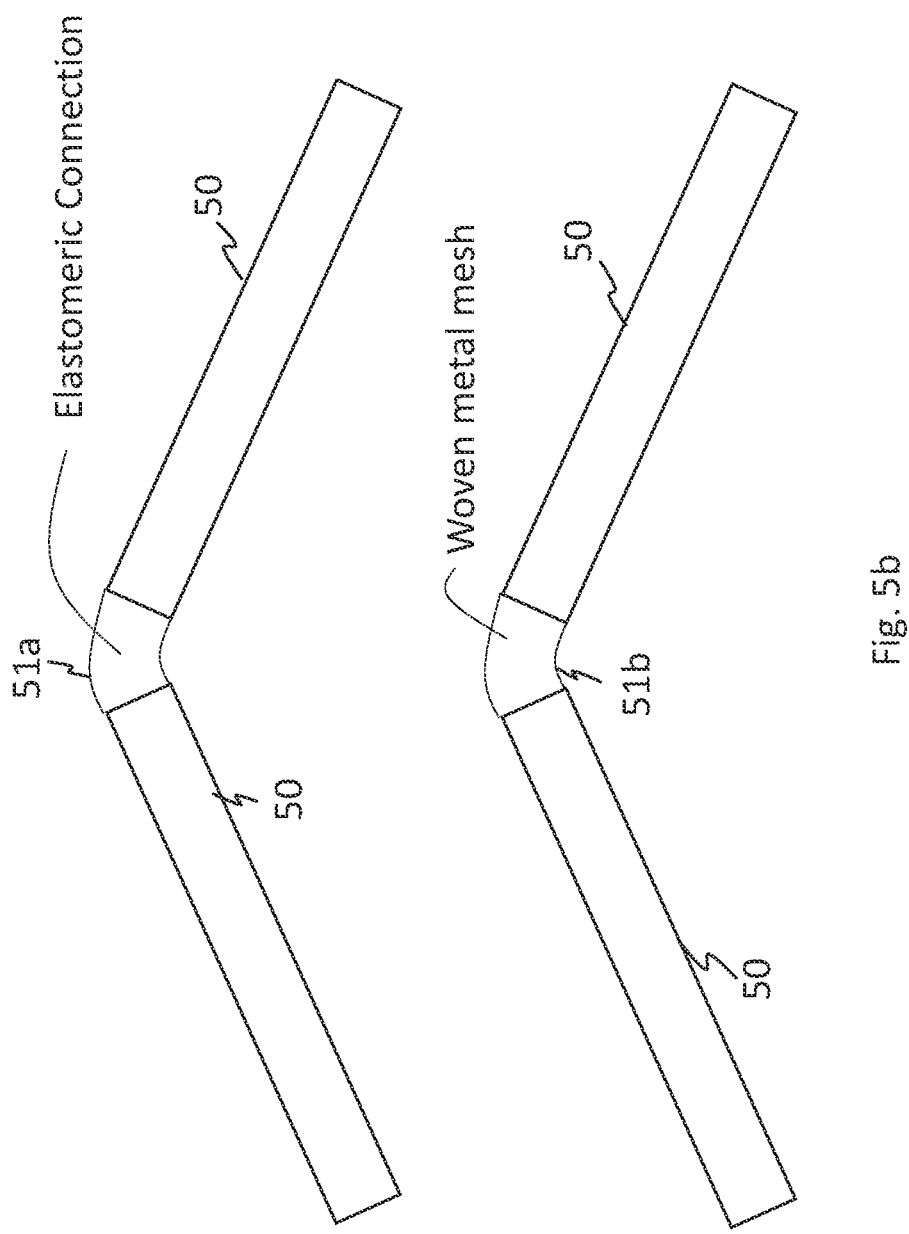

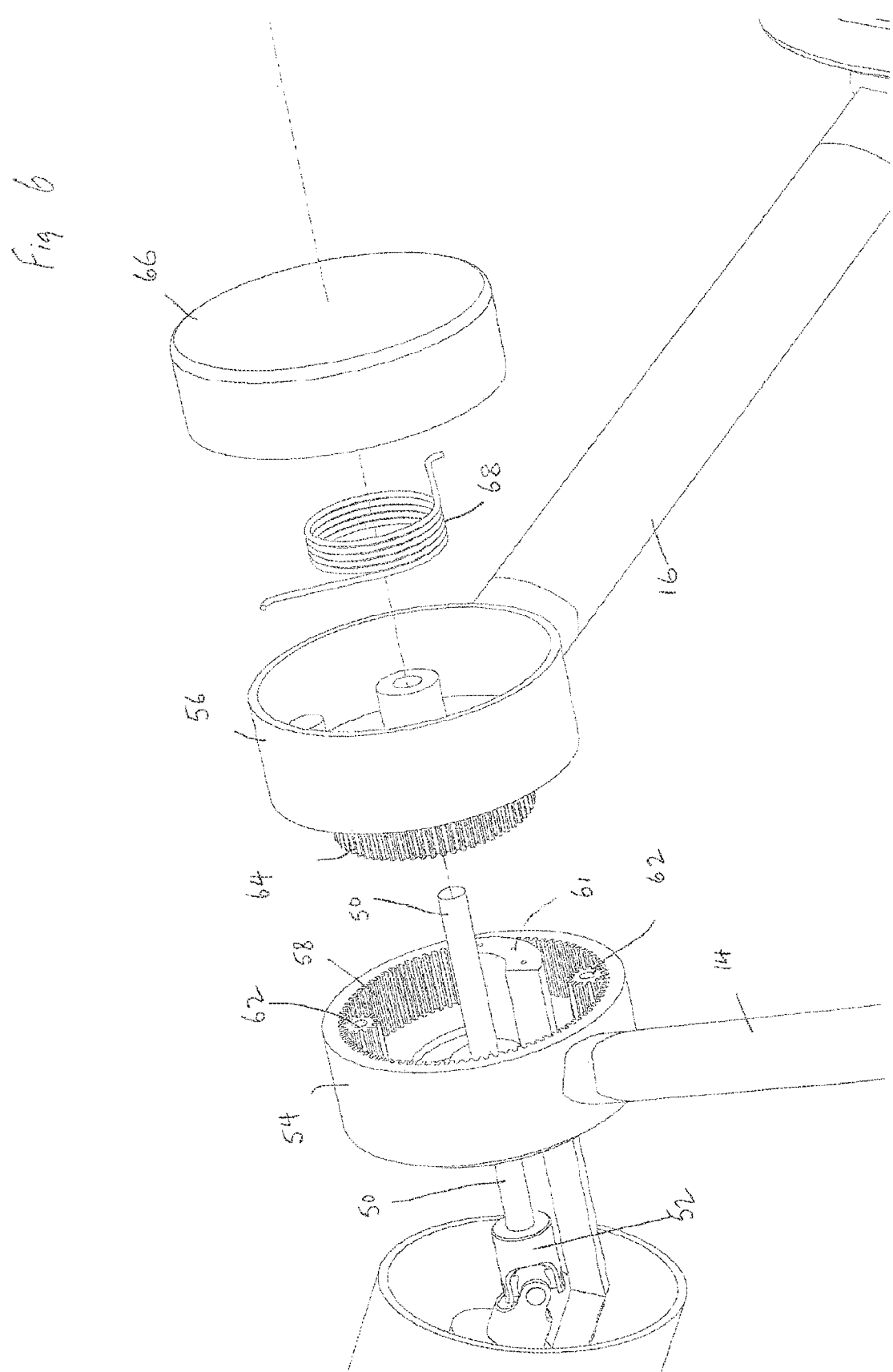

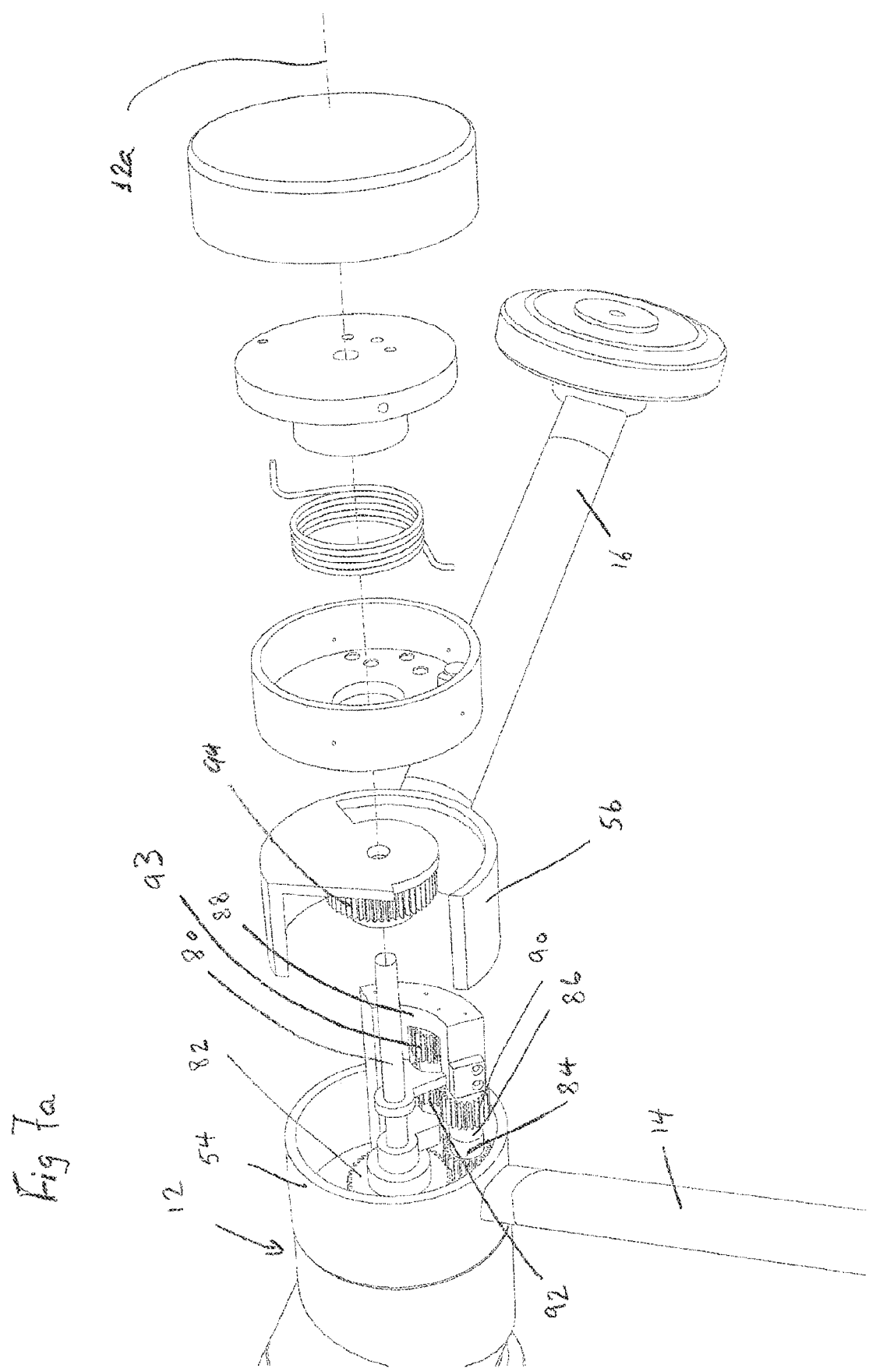

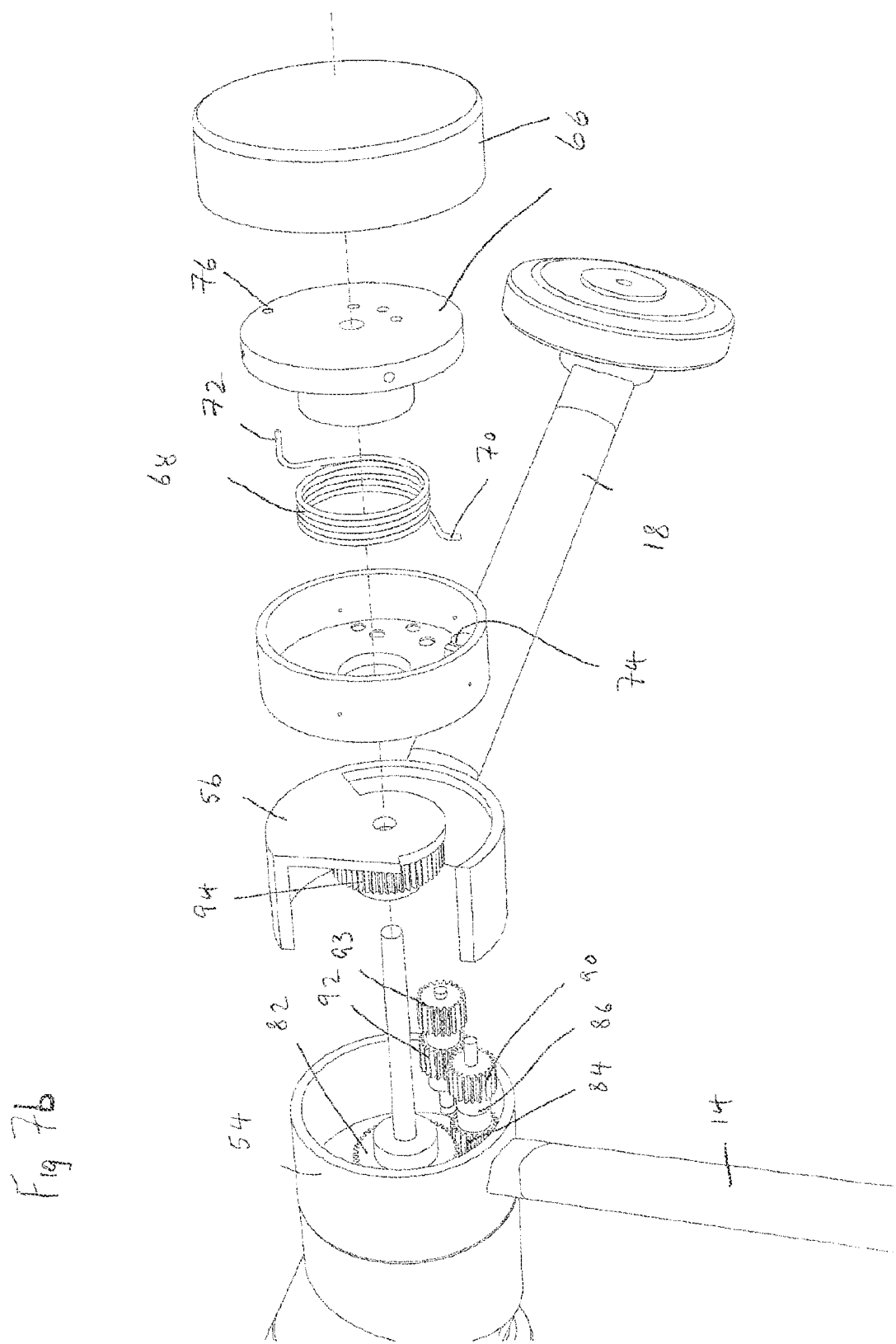

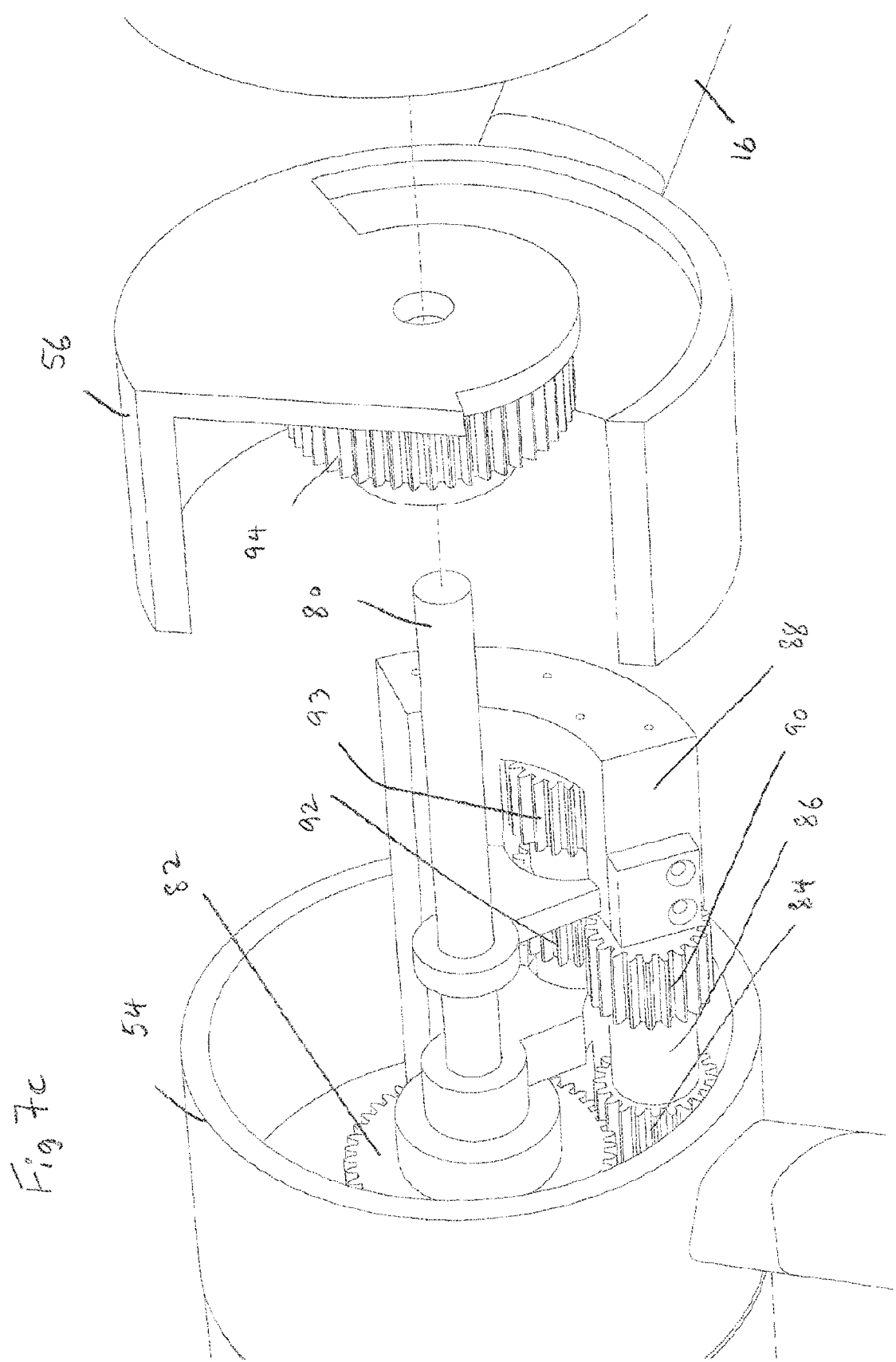

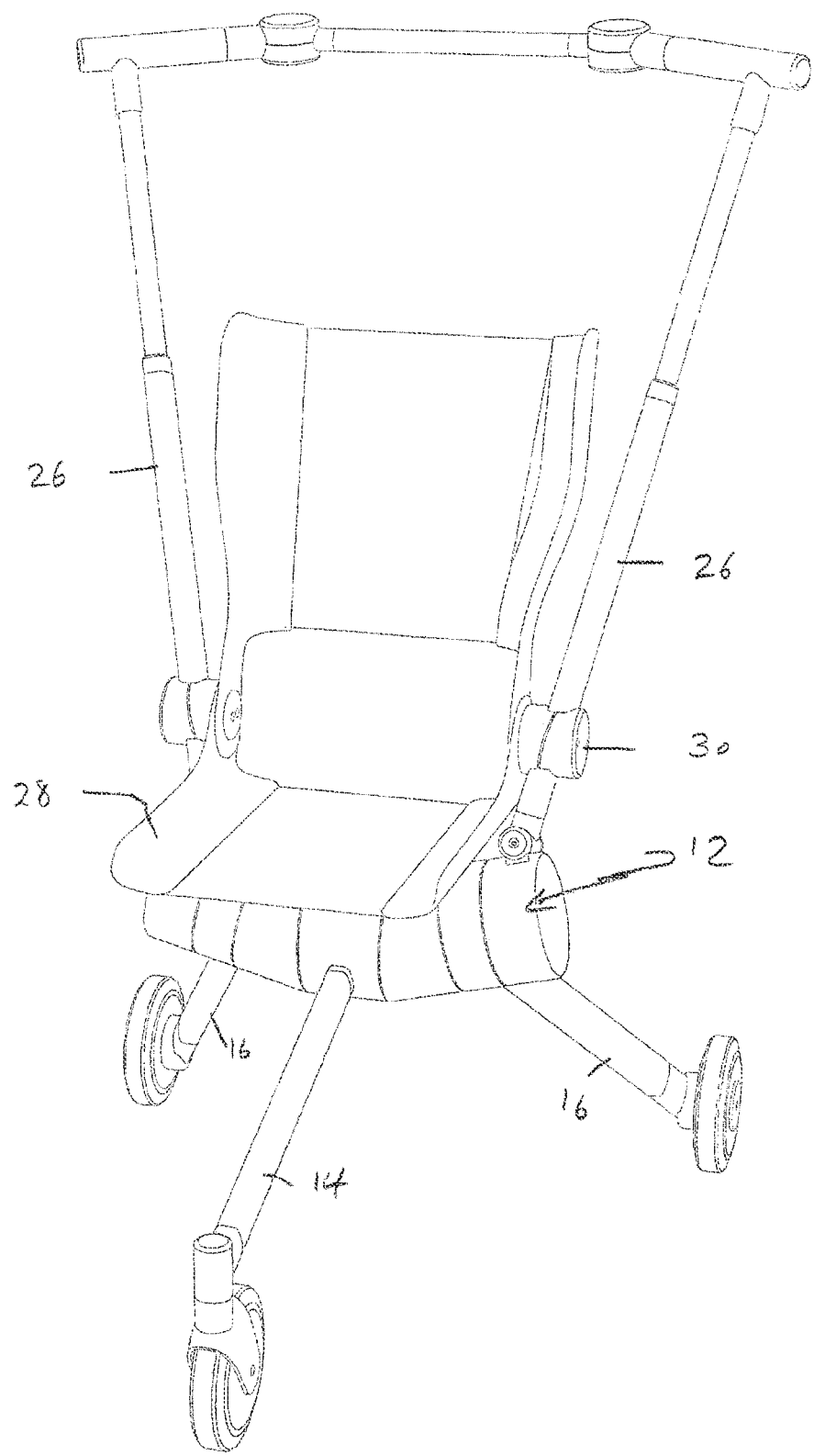

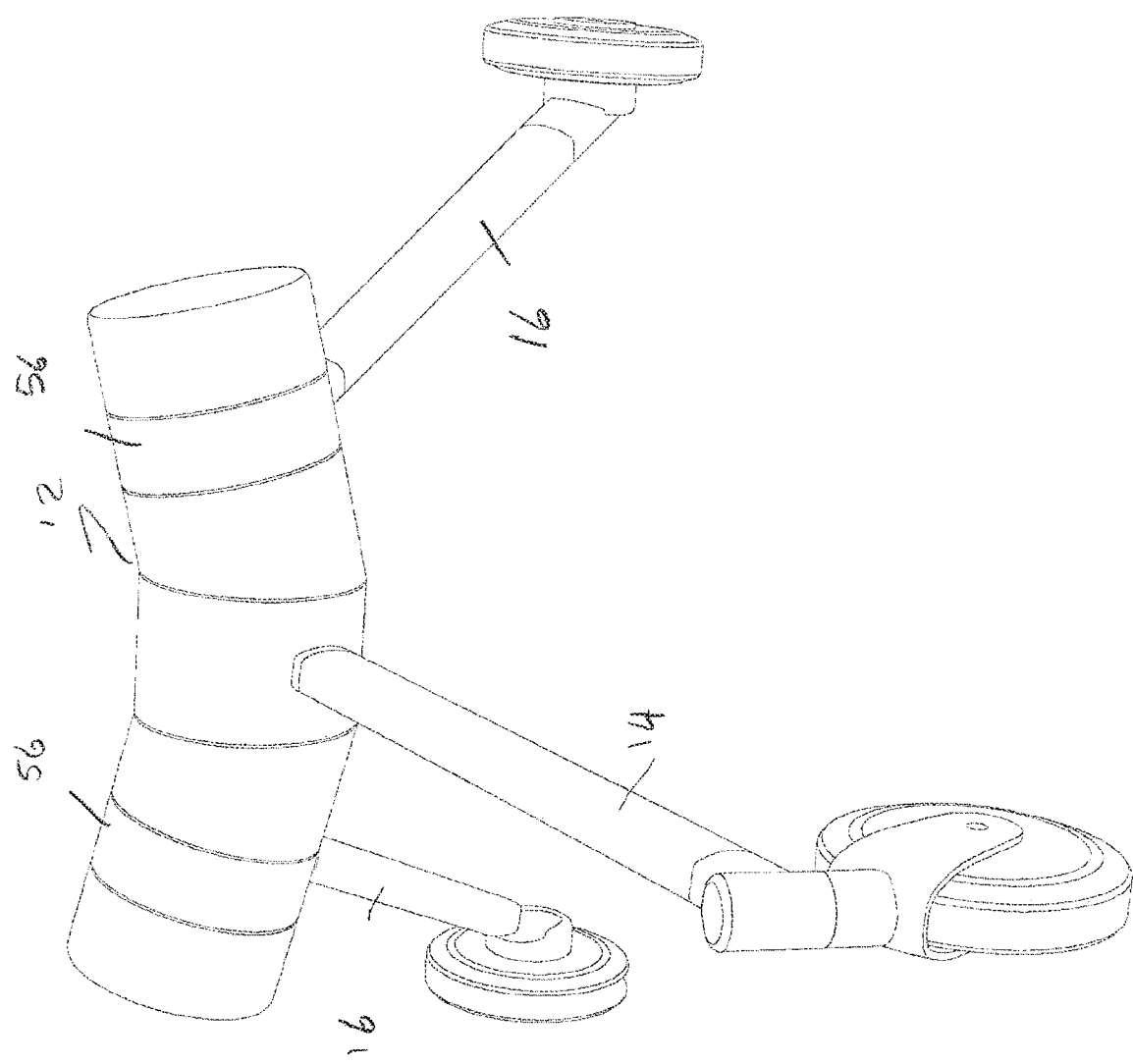

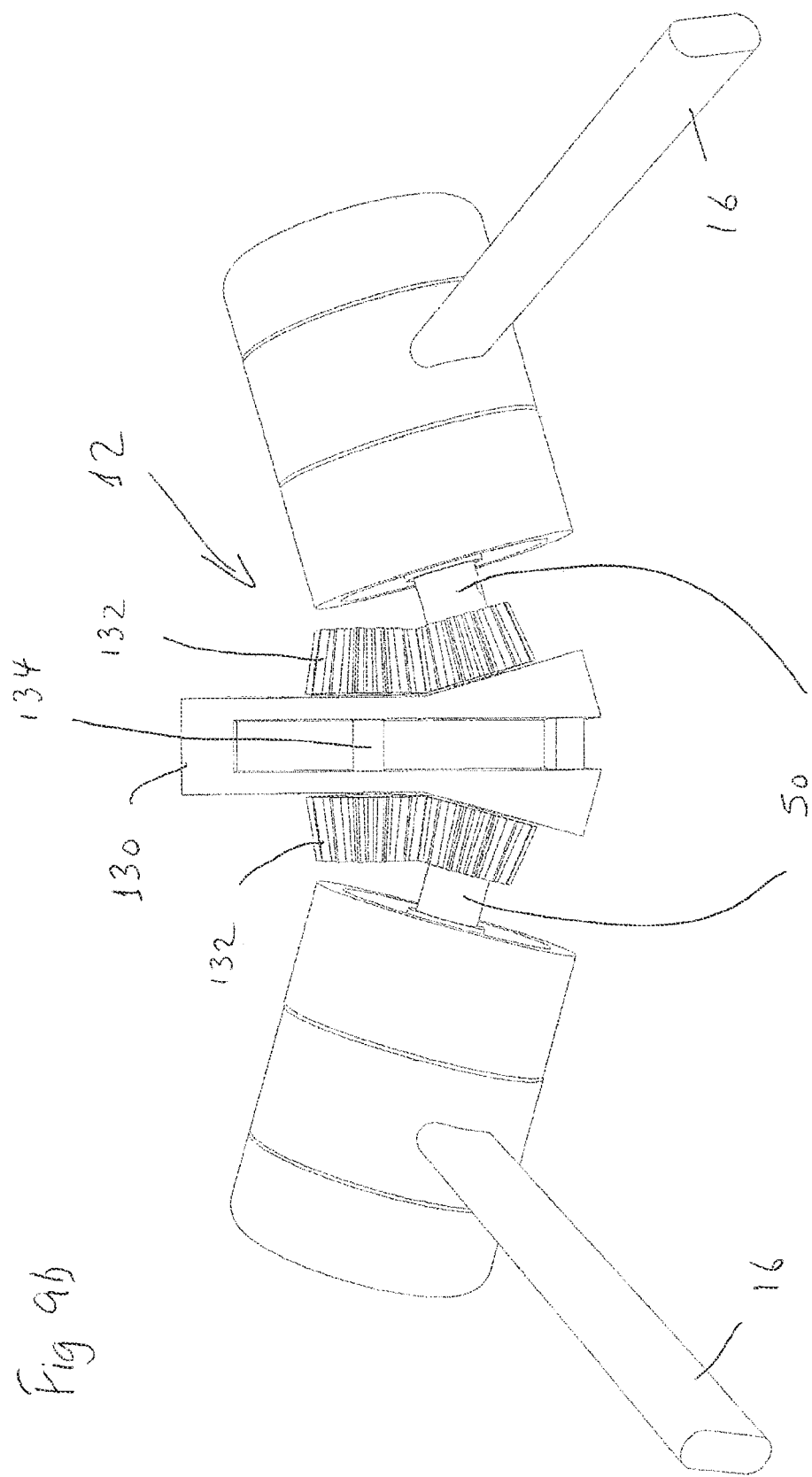

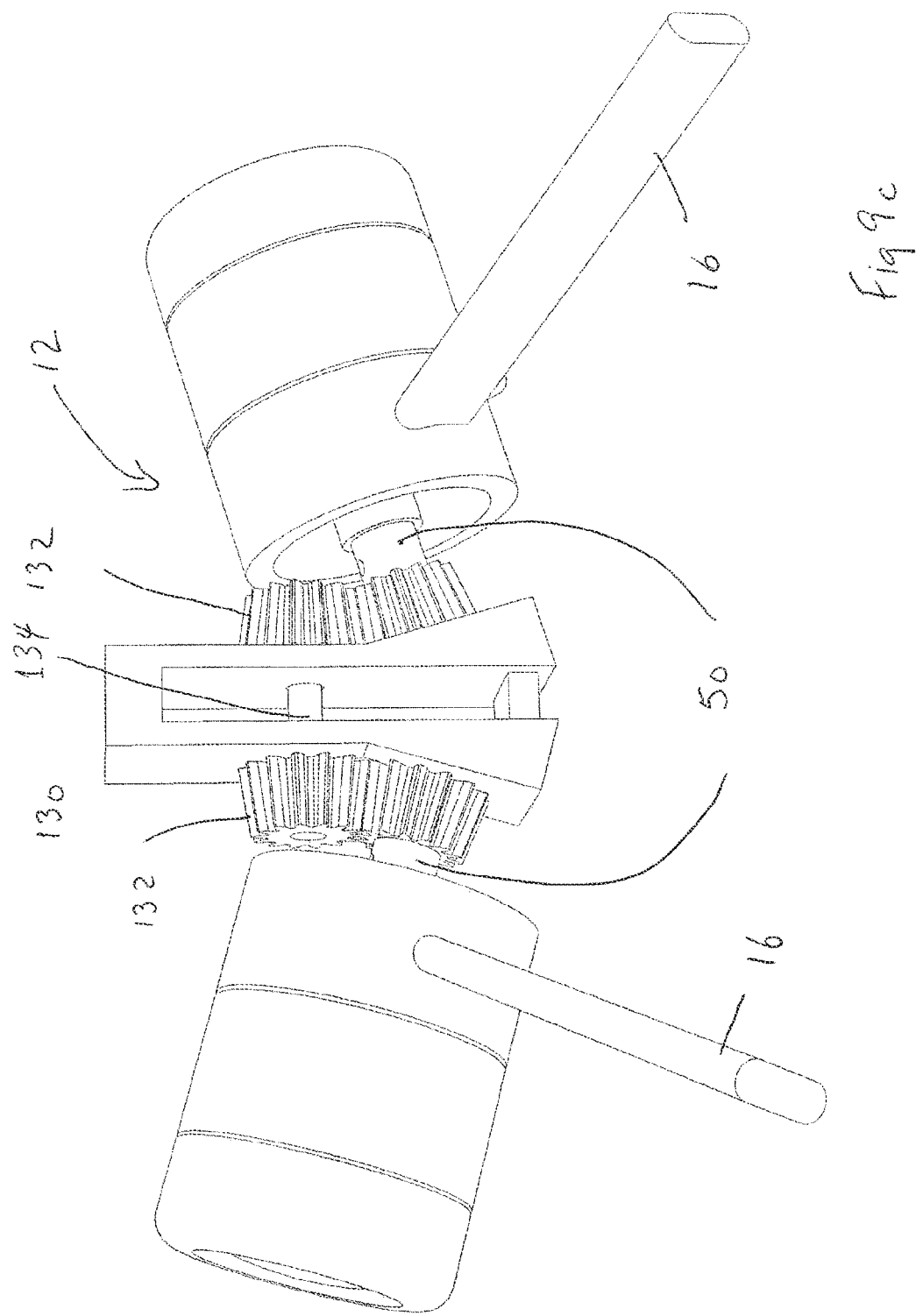

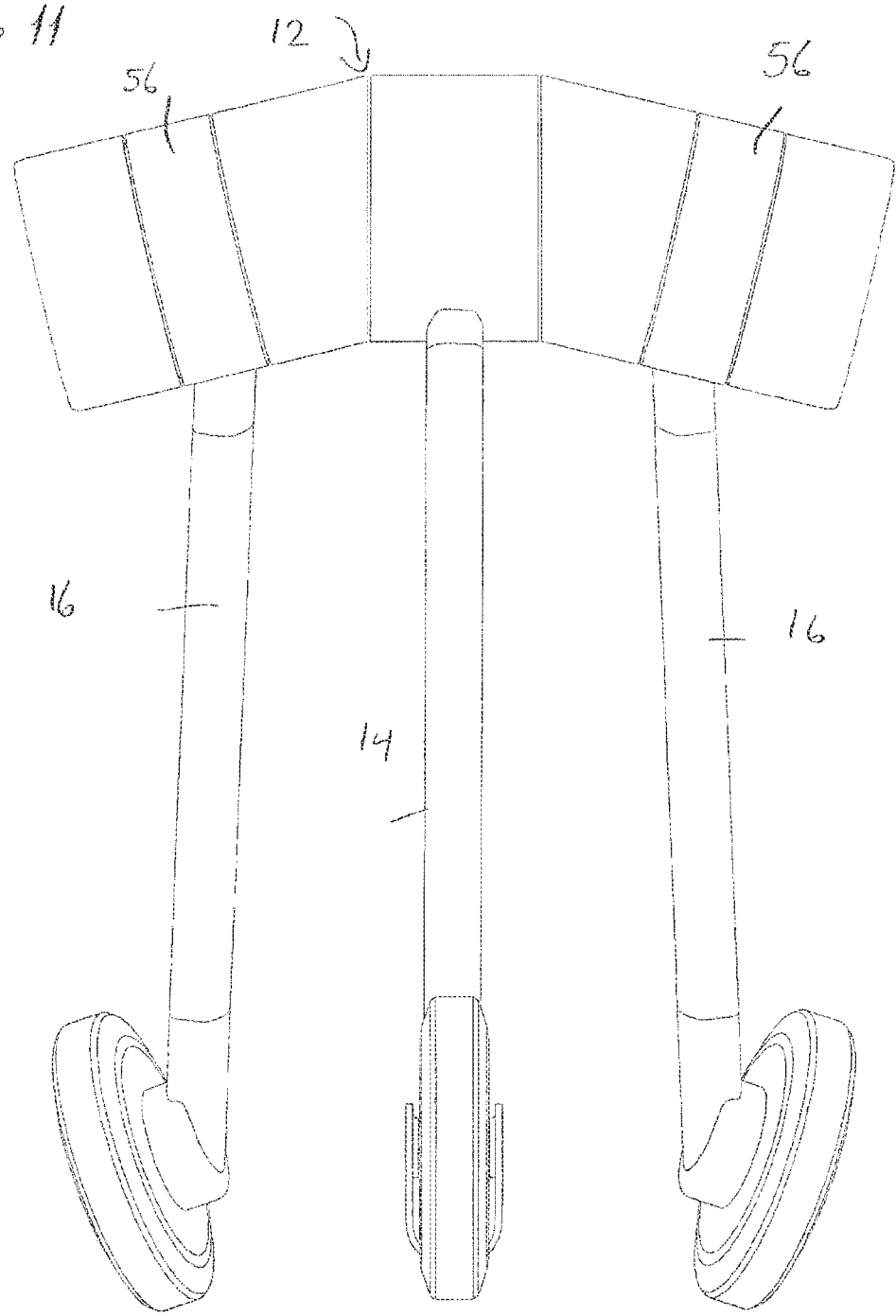

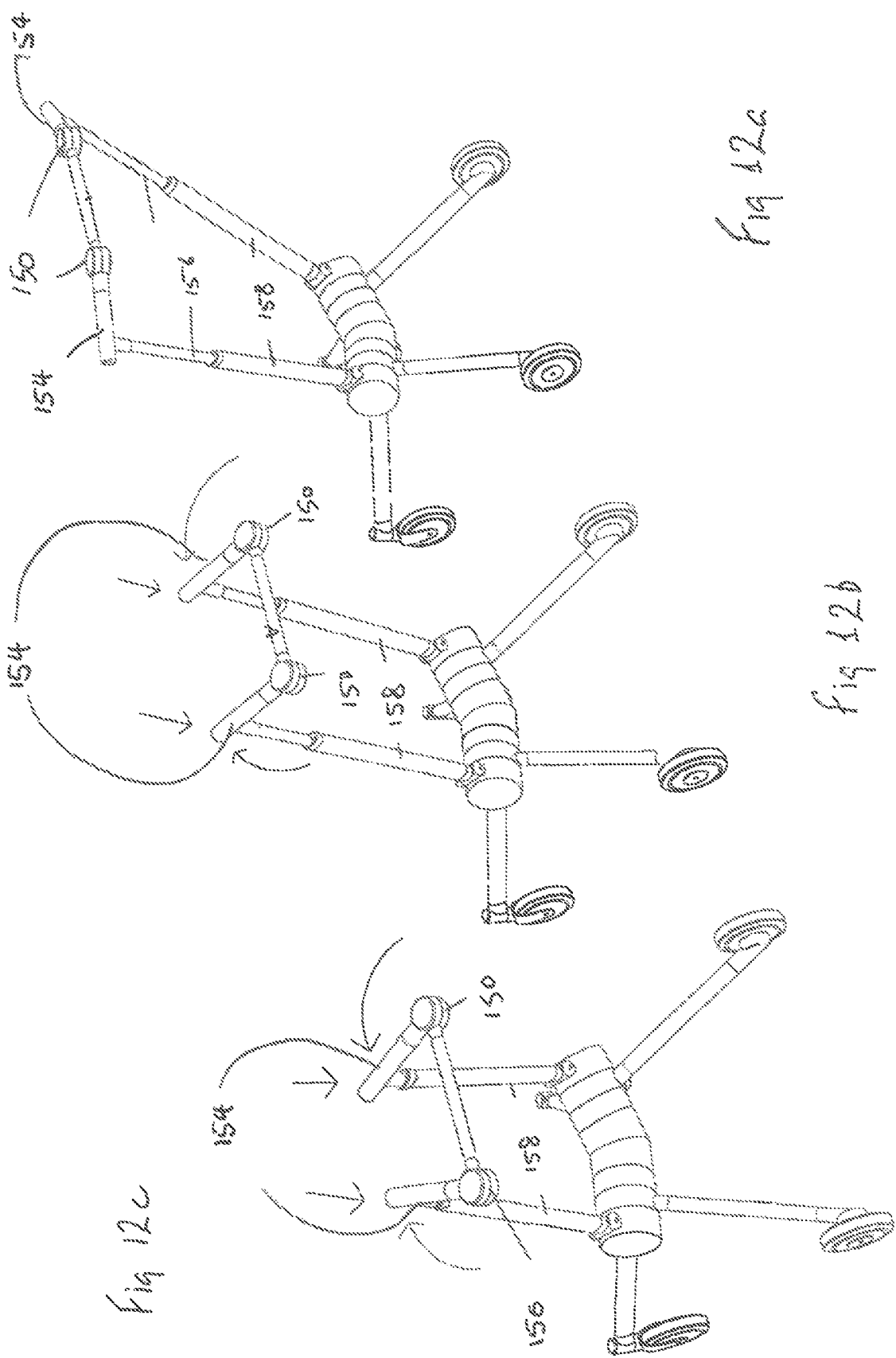

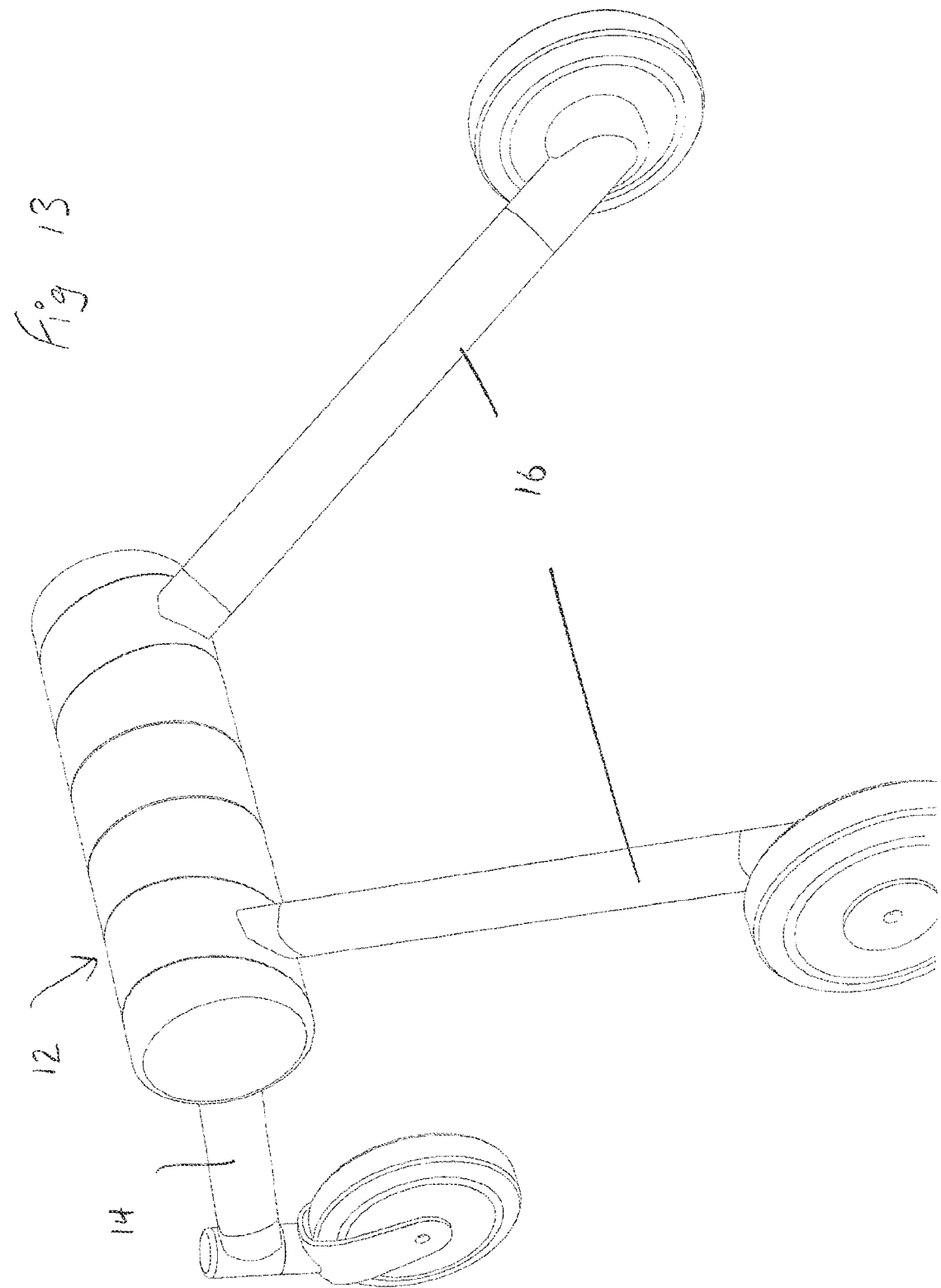

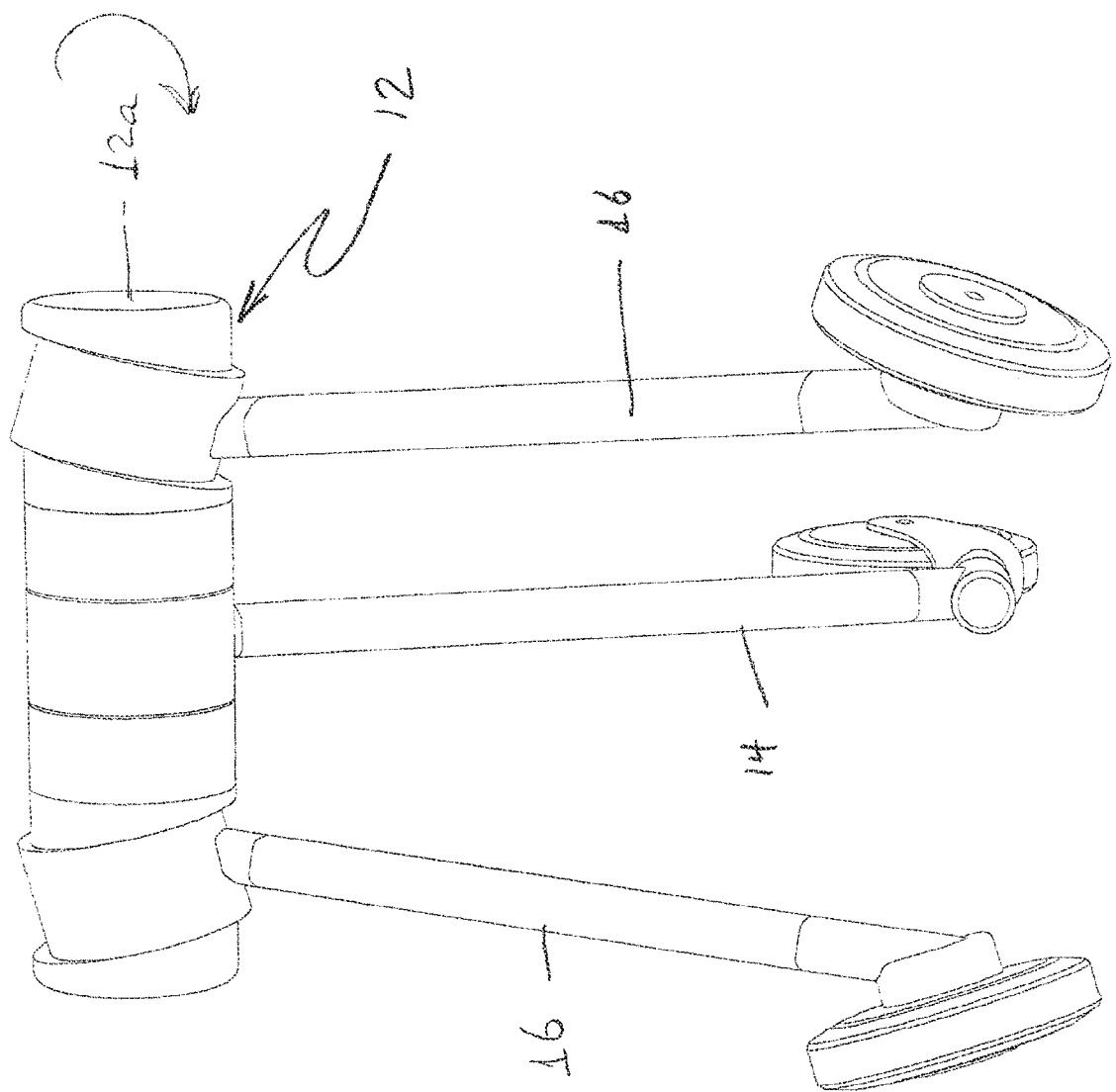

PUSH CHAIR

CROSS REFERENCE TO RELATED APPLICATIONS

This application is a National Stage application of PCT/IB2019/000770, filed Sep. 18, 2019, which claims the benefit of GB Application No. 1821001.3, filed Dec. 21, 2018, and GB Application No. 1815203.3, filed Sep. 18, 2018, all of which are incorporated by reference in their entirety herein.

The present invention relates to a push chair, in particular a push chair with an improved folding mechanism.

Push Chairs are well known for transporting small children and modern push chairs can also be used and adapted for the carriage of babies. In this application, the term push chair is intended also to include what are also commonly referred to as strollers or buggies and is also intended to describe a system comprising a chassis to which can be added a seat or a removable cot or other enclosure suitable for the transport of a baby or a small child. One of the desired features of a pushchair is that it can be folded to a compact dimension, so making it easier to carry, stow in a car or other transport means, such as a bus, train or aircraft.

Many pushchairs are known to fold and stow into smaller dimensions, most only fold into smaller sizes in one or two dimensions. Many examples can be found in the shops and in general use.

US2014/0312599 describes a foldable type of push chair, but in this case foldable to a backpack. The front legs are also foldable to help reduce the overall dimensions.

DE3147657A (Mocking) describes an arrangement having a combination of rods connected to the main support structures for providing the support, the rods being slidably connected to the support to ensure the correct relationship between the support rods.

The disadvantage of known push chairs is that they normally only fold and reduce in one or at most two dimensions. It is an object of the present invention to overcome at least some of the disadvantages of the known prior art by providing a push chair that will fold so that it is smaller in all three dimensions.

According to a first aspect of the present invention, there is provided a foldable push chair comprising a central body assembly extending across the push chair substantially horizontally and perpendicularly to the normal direction of travel of the push chair, a handle assembly connected to the central body and extending therefrom; at least three wheel supporting legs rotatable around the central body and extending from the central body, in the unfolded state one or more wheel supporting legs extending in a forward direction from the central body and one or more wheel supporting legs extending in a rearward direction from the central body; the forward and rearward extending legs being coupled together such that they rotate in opposite directions around the central body during a folding or unfolding operation.

It is known that in many push chairs the folding operation can be complex and requires careful manipulation of the various components. The present invention provides a means of ensuring the components comprising the wheel supporting legs fold and unfold easily and smoothly.

According to another aspect of the present invention, a push chair is provided with at least one forward extending leg and the at least one rearward extending legs are connected together by a gearing system.

According to another aspect of the present invention, in a push chair the gearing system connecting the forward extending legs and rearward extending legs comprises a mainshaft, a countershaft and an idler shaft, all having spur gears mounted thereon.

According to another aspect of the present invention, in a push chair the gearing system connecting the forward extending legs and rearward extending legs comprises an epicyclic gearing system.

A particular advantage of the use of a gearing system for connecting the forward and rearward extending wheel supporting legs is that it enables the rotation of the wheel supporting legs to be controlled, smooth and avoids the need for sliding bars and other supports in which fingers of users, items of clothing or other things can be trapped or entangled. It also provides for a more neat and compact design than often seen elsewhere.

According to another aspect of the present invention, a push chair further comprises a shaft extending through the central body assembly and whose longitudinal axis is coincident with the axis extending through the central body assembly, the forward and rearward extending wheel supporting legs being mounted on said shaft.

According to another aspect of the present invention, a push chair further comprises either two forward extending legs or two rearward extending legs, each of the either forward or rearward extending legs mounted on the shaft such that a plane of rotation of the legs around the axis is not perpendicular to the axis of the shaft and is such that in the folded state, distal ends of the wheel supporting legs are closer together than in the unfolded state.

By mounting the wheel supporting legs mounted on a shaft in a manner which ensures they do not rotate in a plane perpendicular to a longitudinal axis of the shaft but at an angle to it, the rearwardly extending or forwardly extending legs can be rotated in the folded position to have a smaller distance between them than in the unfolded condition and so provide a push chair that folds more compactly in all three dimensions than other known products.

According to another aspect of the present invention, a push chair is provided with either two forward extending legs or two rearward extending legs securely mounted on the shaft rotatable about the axis and rotating together in the same direction; the other of the rearward extending legs or forward extending legs being mounted on a second shaft co-axial with the shaft, the shaft and the second shaft connected by gear means so that the forward extending legs and rearward extending legs rotate in opposite directions during a folding or unfolding operation.

According to another aspect of the present invention, a push chair according to any preceding Claim having two forward extending legs and two rearward extending legs.

According to another aspect of the present invention, a push chair in which the shaft is articulated in a central region of the central body assembly, each arm of the shaft extending from the central region of the central body assembly to an outer part of the central body assembly and inclined to the horizontal to form a "V" shape, each arm supporting one forward and one rearward extending leg.

The use of an articulated shaft having a "V" shape, articulated in the central region of the central body assembly enables the shaft to be articulated and the wheel supporting legs to be mounted on the shaft in a manner which results in a more compact form when they are folded than in a conventional arrangement.

According to another aspect of the present invention, a push chair is provided an articulated shaft in which the articulation between the two parts of the shaft is by means of either a universal joint, or a gearing system, or an elastomeric connector or a woven metal mesh of tubular construction secured to each shaft.

According to another aspect of the present invention, a push chair has a gearing system mounted on at least one of the arms of the shaft towards a distal end away from the articulating connection.

The invention will now be described with reference to the accompanying drawings in which FIGS. 1a-1d show a push chair assembly according to the present invention in its unfolded state;

FIG. 2 shows a wheel and central folding axis assembly in its unfolded state;

Figure 4A:
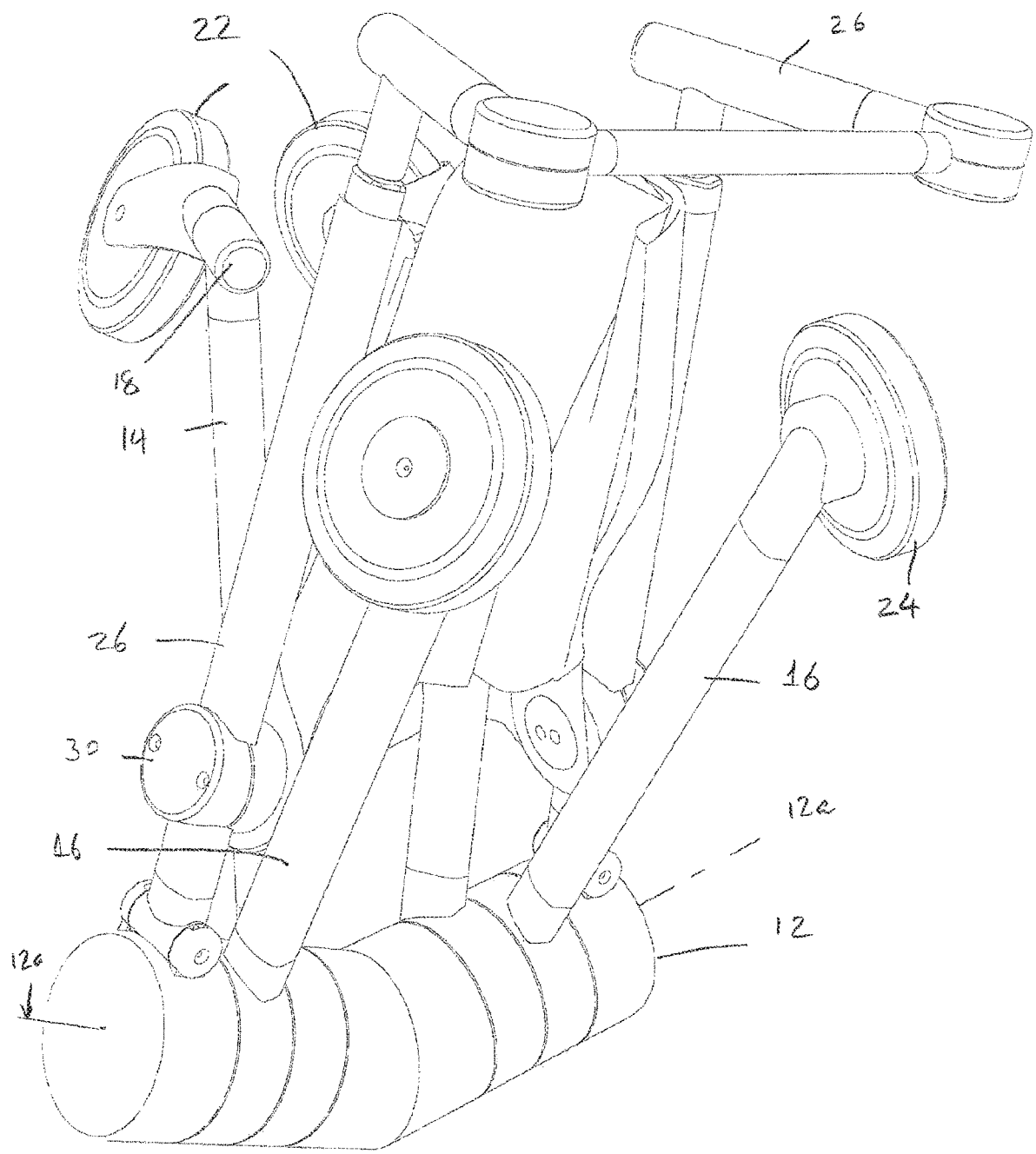
Figure 4B:
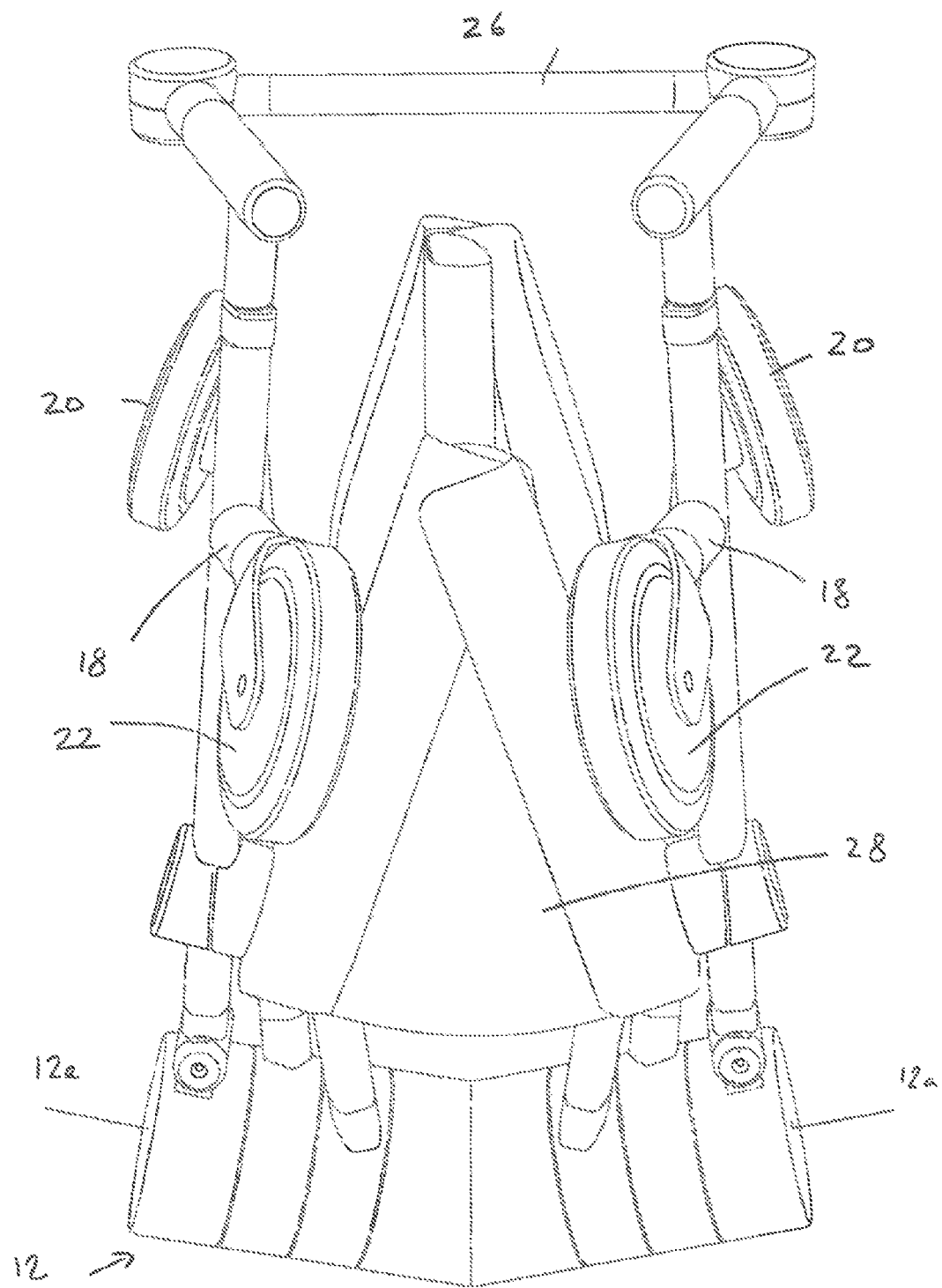
Figure 10:
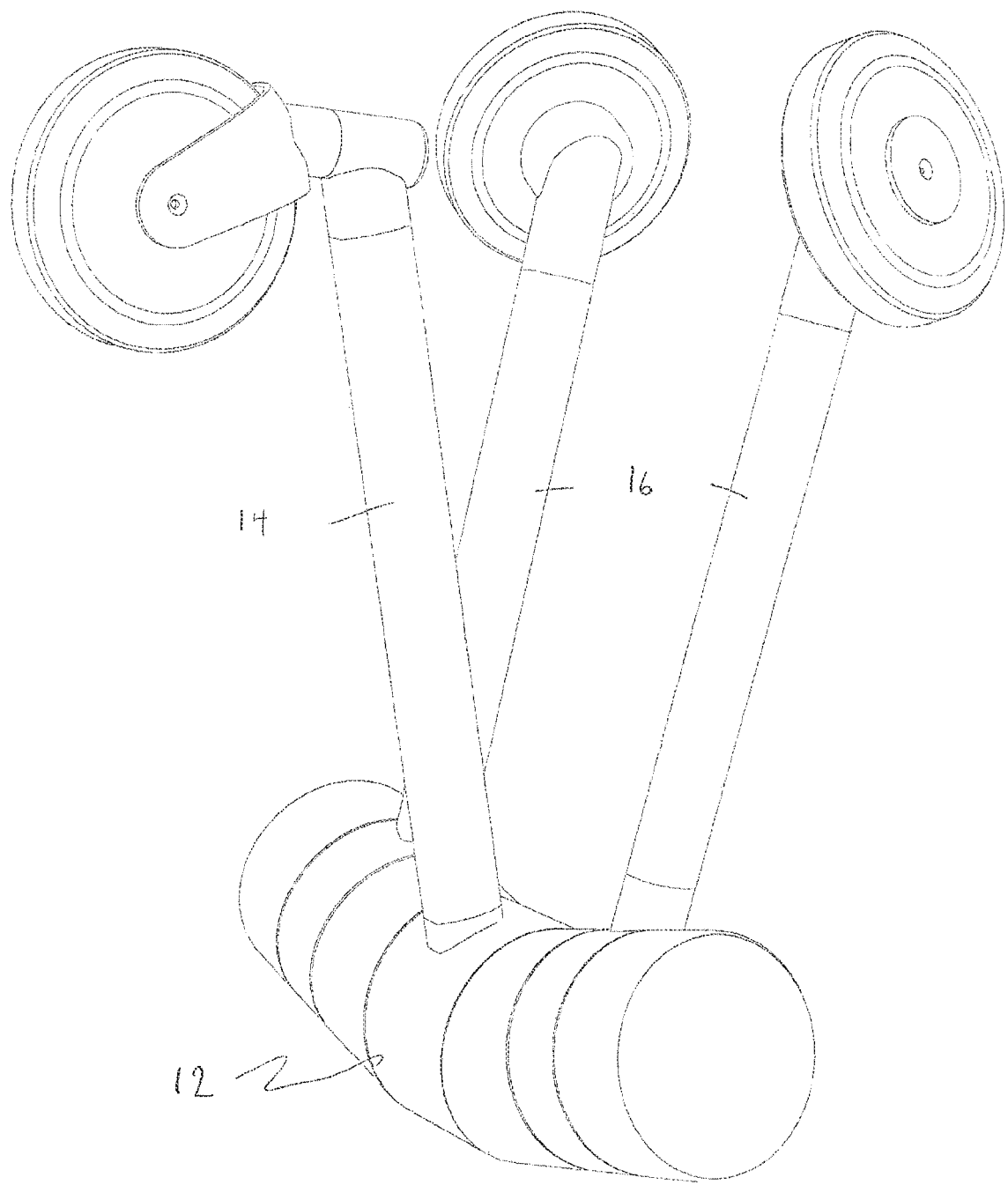

FIG. 4a shows a perspective view of the folded push chair; FIG. 4b shows a plan view of the folded push chair; FIG. 4c shows a view of the chassis of the push chair in the unfolded condition from a front view; FIG. 4d shows a plan view of the folded chassis;

FIG. 5 shows a view of a gearing arrangement used in the push chair to ensure folding of the assembly;

FIGS. 5a and 5b shows different means by which a pair of shafts extending along the central axis may be coupled together;

FIG. 6 shows a more detailed view of a gearing arrangement of FIG. 5;

FIGS. 7a, 7b and 7c show an alternative gearing arrangement for the folding mechanism;

FIG. 8 shows an example of a push chair using only three legs and wheels;

FIGS. 9a-9c show alternative arrangements for the chassis of a push chair of FIG. 8;

FIG. 10 shows the chassis of FIG. 9 folded into a compact folded state;

FIG. 11 shows a plan view of the chassis of FIG. 9;

FIG. 12a-c show an arrangement for a folding handle assembly of the present invention.

FIG. 13 shows an arrangement with a push chair chassis having a linear chassis and three wheels.

FIG. 14 shows a folded version of the three wheel linear chassis of FIG. 13.

The invention will now be described in more detail with respect to each of the drawings.

Figure 1A:
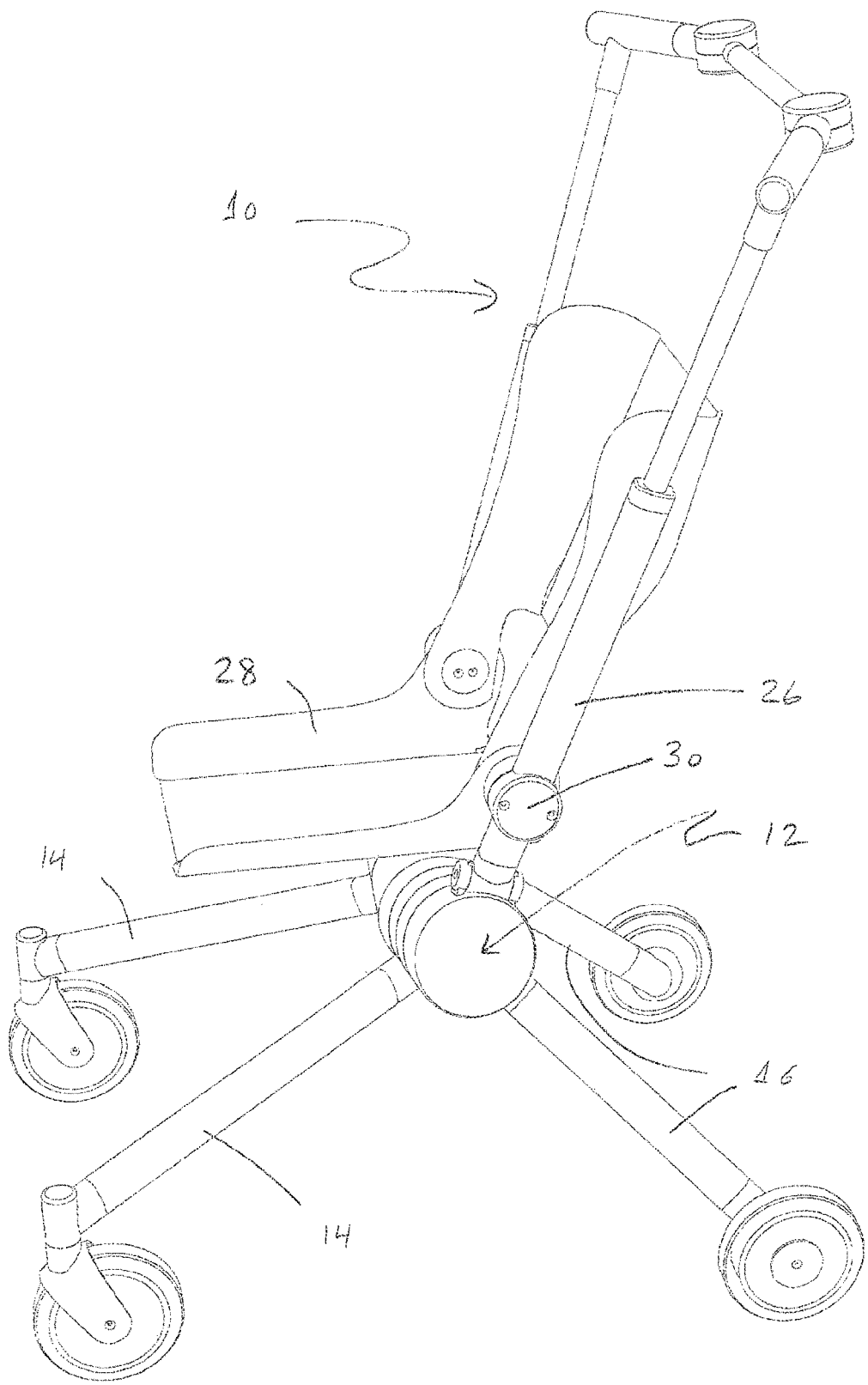
Figure 1B:
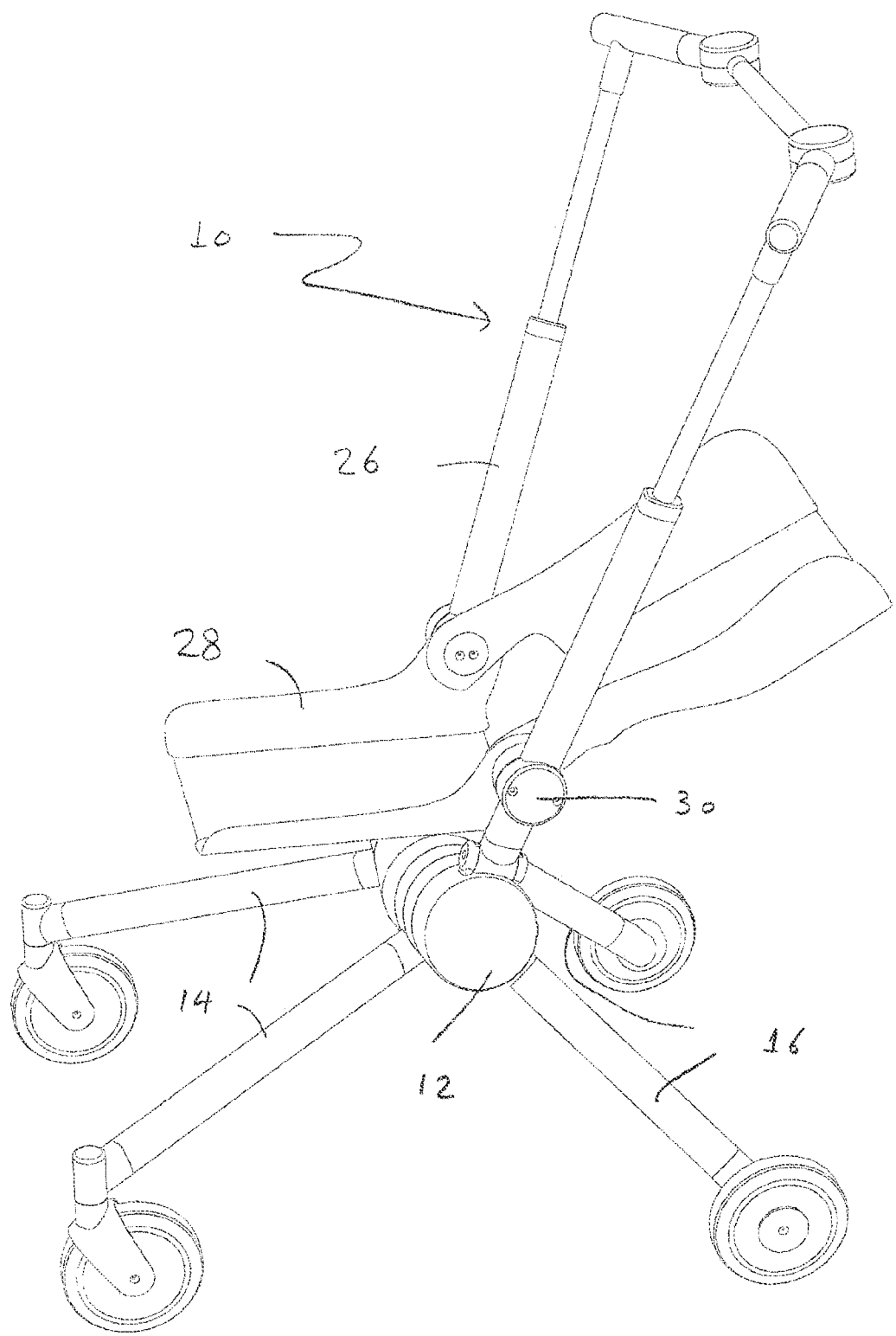
Figure 1C:
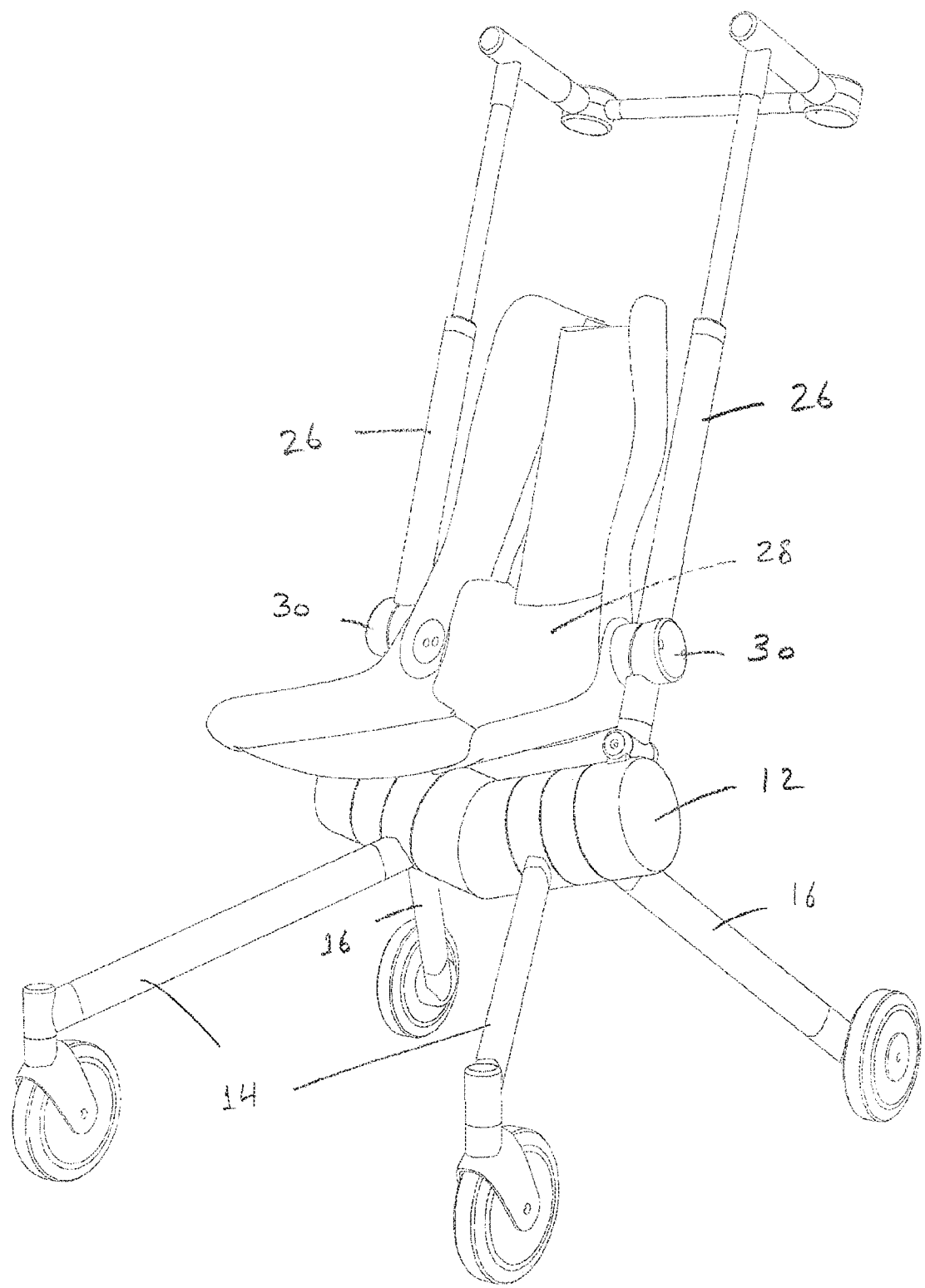
Figure 1D:
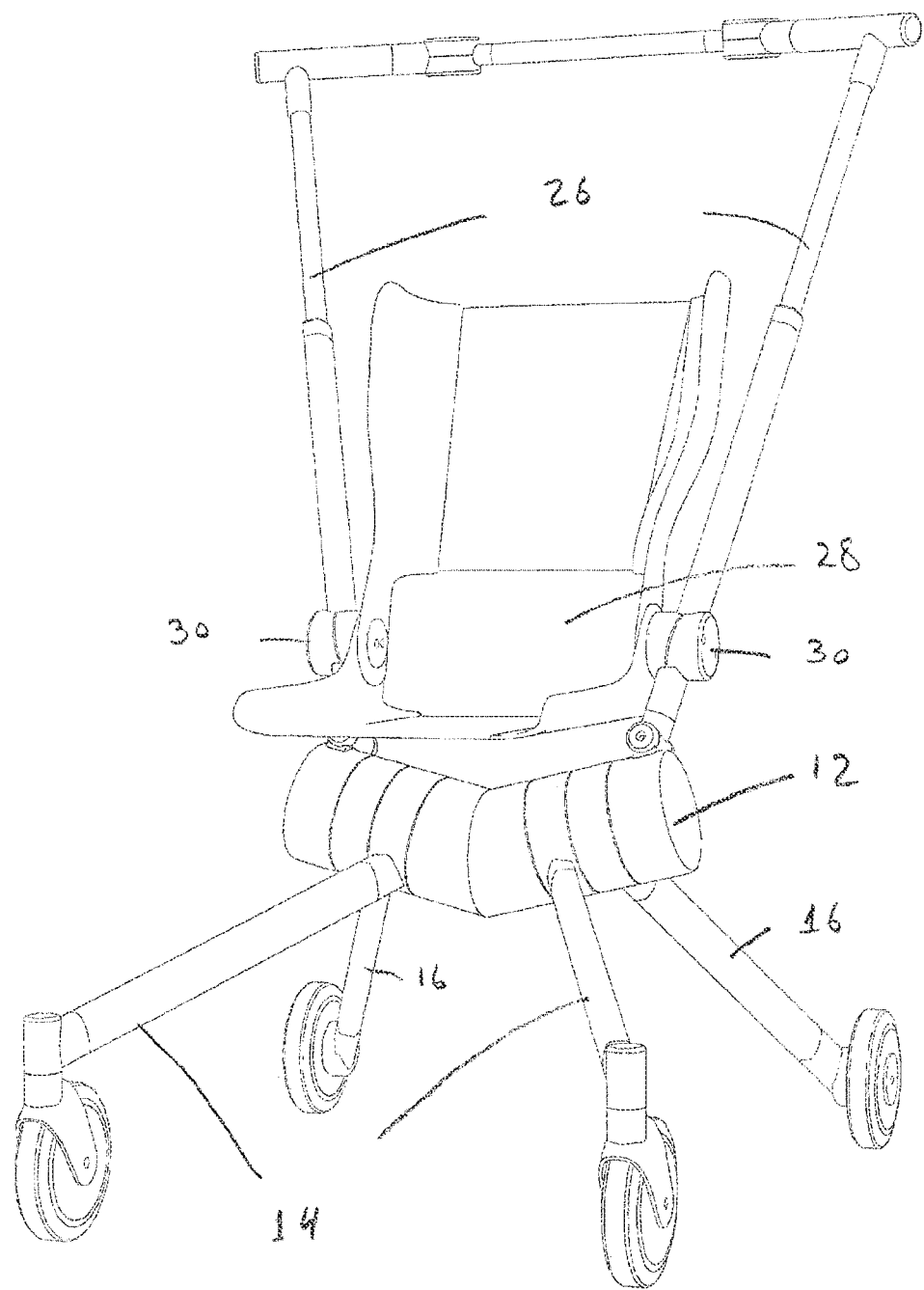

FIG. 1a shows a push chair according to the present invention in the unfolded state. FIG. 1b shows a back rest of a seat portion in a semi-reclined position. FIGS. 1c and 1d show different side views of the pushchair. The push chair 10 comprises a central chassis assembly 12, a forward extending leg 14 and a rearward extending leg 16 and a handle 26 all mounted on the central chassis assembly 12. The forward extending legs and rearward extending legs are rotatable about an axis 12a passing through the central chassis assembly. A seat assembly 28 is mounted on the handle 26 by seat mounting means 30. As can be seen, normally the seat will be in a substantially upright position, but can be reclined at least partially as shown in FIG. 1b.

FIG. 2 shows the central chassis assembly 12, which can be clearly seen is in the shape of a "V" extending across the chassis in a direction substantially perpendicular to the normal direction of travel. A forward extending leg 14 and a rearward extending leg 16 extend from a first arm of the V and a second forward extending leg 14 and a second rearward extending leg 16 extend from a second arm of the V. For convenience and to help ensure clarity of the drawings, handle portions comprising the handle 26 which would be mounted on each arm of the V of the central chassis assembly 12 to facilitate the pushing and maneuvering of the push chair are not shown here.

At distal ends of the forward extending legs 14 are front wheel assemblies 18 and at distal ends of rearward extending legs 16 are rear wheel assemblies 20. Normally the rear wheel assemblies are arranged so that rear wheels 24 can rotate about a substantially horizontal axis. Front wheel assemblies 18 include front wheels 22 that can rotate about the normally horizontal axis and are additionally arranged so that they can rotate about a substantially vertical axis, so providing a potential steering facility in order to increase the maneuverability of the push chair.

A particular advantage of mounting the wheel supporting legs on a V shape chassis is that it facilitates the folding of the push chair assembly into a smaller volume than might be possible with other and known arrangements without compromising the strength or utility of the unfolded push chair. More particularly, it enables the push chair of the present invention to be folded so that it is smaller in all three dimensions when folded than in the unfolded state, so enabling it to be more easily stored or transported than a similar design in which the central chassis extends only in a straight line.

Figure 3B:
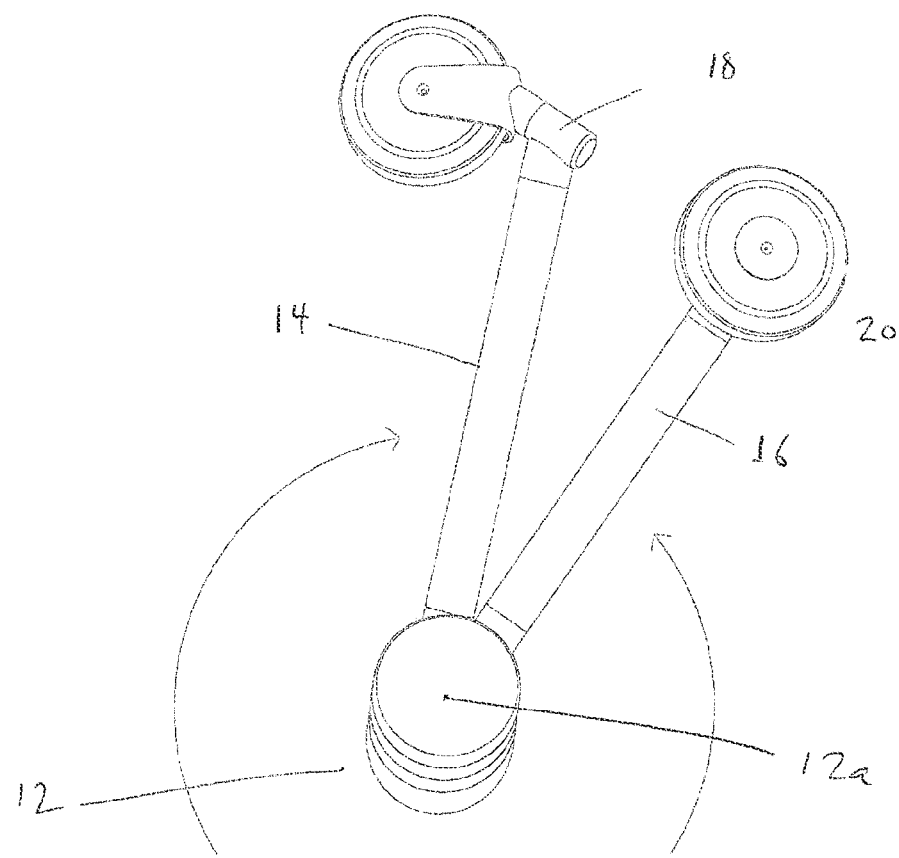
FIGS. 3a and 3b show a how the push chair folds around a central axis.
Figure 3A:
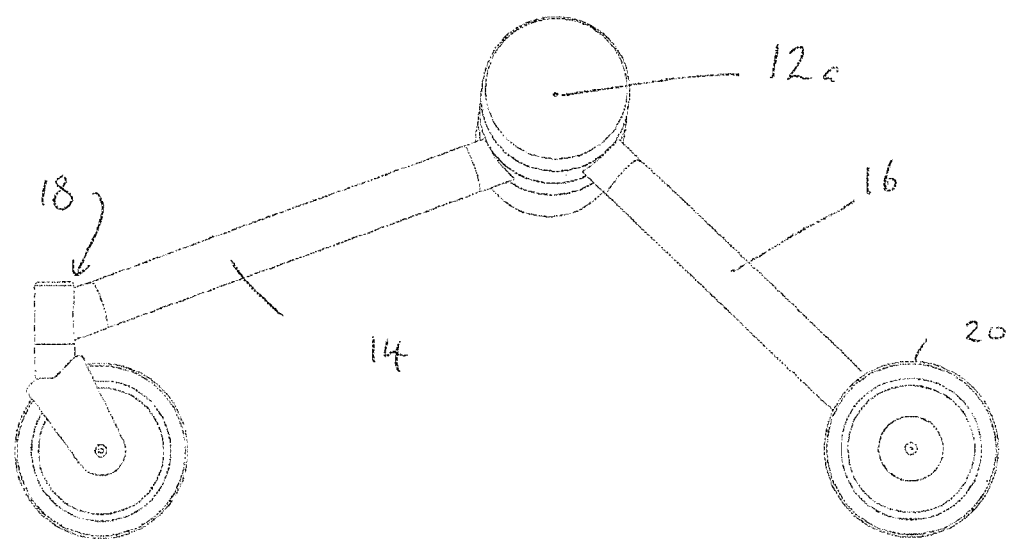

FIG. 3a shows one arm of the V shaped central chassis with the forward extending leg 14 and the rearward extending leg 16 in the unfolded position. FIG. 3b shows how the two legs can be rotated about the axis 12a to fold and form a compact folded arrangement.

FIG. 4a shows a perspective view of the folded push chair, which as can be seen has particularly compact dimensions. FIG. 4b shows a plan view of the folded push chair. FIG. 4c shows the push chair chassis in the unfolded condition from a front view; and 4d shows a plan view of the folded push chair chassis. As can be seen from the dotted lines extending from the outer track of the rear wheels in FIG. 4c to FIG. 4d, in the folded condition, the width of the folded push chair is noticeably less than in the unfolded state. Forward extending legs 14 and the rearward extending legs 16 are mounted on bearing means which enable them to be rotated about axis 12a to move between the folded and unfolded positions described in more detail below.

In order to ensure the push chair folds neatly and consistently, the forwardly extending legs 14 and rearwardly extending legs 16 are connected together by gearing means that ensure they rotate in synchronism.

In other known foldable push chairs the folding assembly and mechanism relies upon wheel supporting legs and other supporting or cross-bracing arms connected together with linkage mechanisms that are engaged with pivotable and/or slidable connections to maintain the relative positions between the various arms and legs. Such complex connections between the arms and legs require careful operation and users find that users fingers or other objects can become caught or trapped in the sliding or pivoting components. This is at best inconvenient and worse can be painful and cause injury if the items being caught are fingers or other parts of a user's body. A particular advantage of the present invention is that the folding mechanism does not use or rely upon one or more sliding arms or pivoting components to assist in folding the forward or rearward extending legs and such sliding arrangements are not required to maintain the strength and structural integrity of the push chair according to the present invention.

FIG. 5 shows an expanded view of a gearing arrangement used in the push chair to ensure the operation of the folding or unfolding of the push chair. In this particular figure the arrangement comprises an epicyclic gear assembly, detailed construction and operation of which is explained below. The figure shows the arrangement on one arm of the V shaped chassis, the same type of arrangement can be used on the other arm, but is not shown for the purposes of simplicity. Each arm of the chassis defines an axis of rotation 12a of the forward and rearward extending legs 14 and 16. A shaft 50 extends along the axis 12a. Shaft 50 is connected to a corresponding shaft in the other arm of the V by a universal joint or universal swivel coupling 52. Whilst a universal swivel coupling is a convenient and well known means of coupling the two shafts in the arms of the chassis, other means can be used and envisaged. FIG. 5a shows the swivel joint is replaced by a simple pair of bevel gears 51, each mounted on one of the shafts 50, the gears engaging to ensure coupled rotation of the shafts. Further examples of the coupling of the shafts 50 are shown in the FIG. 5b where the coupling could be any of a flexible elastomeric material 51a, a device similar in construction to an automotive constant velocity joint, a tube of a woven metal mesh 51b capable of transmitting torque. Forward extending leg 14 has a hub portion 54 comprising the end of the leg and rotatably mounted on the shaft 50 extending through central chassis 12. The hub 54 is provided with internal spur gear teeth 58 comprising the annulus of the gear assembly. An internal chassis 60 is rotatably mounted on shaft 50. Planet gears 62 are mounted on the internal chassis so that they engage with the spur gear teeth 58 of the annulus. Rearwardly extending leg 16 also has a hub portion 56 where it is mounted on the shaft 50 of the chassis 12. The hub portion 56 is provided with a set of external facing spur gear teeth 64 comprising the sun portion of the gear train which engage with the planet gears 62. The internal chassis 60 includes tongues 61 extending therefrom in a plane substantially parallel to the axis 12a, the tongues engaging in slots 63, 65 respectively in hubs 54 and 56 to limit the rotation of the internal chassis with respect to the hubs.

It will be apparent that when assembled, the forward extending leg and rearward extending leg are connected by the epicyclic gear train so that as the push chair is folded, the two legs will rotate in opposite directions as the chair is folded or unfolded. A cover unit 66 is provided at the end shaft 50 to protect the gear assembly. Preferably, the cover unit also provides a hub for mounting the handle 26 (not shown) which extends therefrom.

A further improvement to the push chair is provided by the addition of a spring 68, which, depending on the chosen configuration can be used to assist the folding or unfolding of the push chair. In this embodiment, the spring shown is a coil spring in which a central axis of the coil is parallel to, if not co-axial with, the axis 12a. The spring 68 has end parts or arms 70, 72 which each extend away tangentially from the central axis of the coil to provide stabilizing or mounting arms. One of the arms 70 engages with a retaining stop 74 in the hub 56, the other arm 72 engages in a retaining slot or hole 76 in cover assembly 66.

FIG. 6 shows a close up view of the epicyclic gear assembly partially assembled and in which the internal chassis 60 is located inside the hub 54 and the planet gears 62 are engaged with gears 58 of the annulus.

An alternative form of gear assembly is shown in FIGS. 7a-7c.

FIG. 7a shows a cut away drawing of an assembly using an alternative gearing arrangement comprising a main shaft and countershaft arrangement. Such types of gear systems are commonly found in many applications, such as automotive transmissions or gearboxes. In this case a main shaft 80 extends along the line defined by the central axis 12a. A spur gear 82 is mounted on the mainshaft 80 and either secured to the hub portion 54 of the forwardly extending leg 14 or forms an integral part of it. Spur gear 82 in turn engages with a countershaft gear 84 mounted on a countershaft 86 (also known as a layshaft) supported in a countershaft chassis 88. Countershaft 86 is supported by and extends through the chassis 88 and includes a second countershaft spur gear 90 which in turn engages with an idler gear 92 on an idler shaft (not shown separately). The idler shaft is also supported in the countershaft chassis. A second idler gear 93 is also mounted on the idler shaft and engages with a second spur gear 94 connected to the hub 56 of the rearwardly extending leg 16. By this arrangement, rotation of the forwardly extending leg 14 causes the countershaft gear 84 to be rotated about its axis and in the opposite direction to the rotating leg. This motion is transmitted through the countershaft and any gears mounted thereon to the idler gears 92 and 93 which are caused to rotate in the opposite direction. The idler gear 93 is in turn engaging with second spur gear 94 in the hub 56 of the rearwardly extending leg 16 and so caused to rotate in the opposite direction to the rotation of the idler gear. By the use of the transmission system, the rotation of one wheel supporting leg in one direction causes the other wheel supporting leg to rotate in the opposite direction.

Advantageously, the forward extending and rearward extending legs are on the same axis, so presenting a very compact arrangement for the chassis when folded.

For the purposes of construction, it is a matter of convenience and constructor's preference whether the main shaft is connected to the hubs of the forward or rearward extending legs and which gear is connected to the idler gears; the operation and result is the same.

FIG. 7b shows this operation in greater detail on a larger scale.

FIG. 7c shows the design without the supporting chassis 88. In this case the countershaft 86 and second countershaft gear 90 can be clearly seen. The arrangement for the idler gears 92 and 93 and their shaft can be clearly seen.

In order to ensure that both the forward extending legs and both the rearward extending legs on each side of the push chair rotate in the same direction and at the same rate, the shaft 50 (or shaft 80) extends through a central region of the chassis and either both forward extending legs are securely mounted on the shaft, and the rearward extending legs are rotatably mounted on the shaft and driven by the gearing system to rotate in the opposite direction to the forward extending legs; or the rearward extending legs are securely mounted on the shaft, and the forward extending legs are rotatably mounted on the shaft and driven by the gearing system to rotate in the opposite direction to the rearward extending legs.

The concept of a single central chassis with forward and rearward extending legs can also be applied to a three wheel design push chair as shown in FIG. 8. In this example of an embodiment, the push chair has one forward extending leg and two rearward extending legs. The other components have the same numbering as used in the earlier description.

FIG. 9a shows an example of a three wheel chassis alone, without the handle and seat mounting means, and FIG. 10 shows the three wheel push chair chassis in a partially folded condition.

FIGS. 9b and 9c show alternative means of connecting the shafts 50 together so that they both rotate in the same direction at the same time. FIG. 9b shows an alternative gear system, which includes a separate supporting chassis 130. Bevel gears at the end of each shaft 50 engage beveled idler gears 132 mounted on an idler shaft 134 in the supporting chassis. This arrangement would be particularly suitable in the event a three wheel design is chosen. In the case of a three wheel design, a central wheel supporting leg could be mounted on the idler shaft 134 in the supporting chassis 132. FIG. 9c shows a perspective view of FIG. 9b. For the sake of clarity, the central wheel supporting leg and wheel assembly is not shown. From the figure it will be apparent that the central wheel supporting leg could be mounted on the shaft 134 so that it rotated with the shaft. This construction would ensure the central wheel supporting leg would rotate in the opposite direction to the rearward extending legs 16.

FIG. 10 shows a perspective side view of the folded arrangement of a three wheeled design.

FIG. 11 shows a plan view of the folded arrangement of a three wheeled design.

FIGS. 12a-c show a general view of the handle assembly. From these drawings it can be seen that the handle assembly is provided with multiple articulation points which enable it to be folded to a more compact dimension and in particular a narrower width than the unfolded push chair. FIG. 12a shows the handle in the fully extended position. FIG. 12b shows an intermediate folded position, and FIG. 12c a second intermediate folded position.

In FIG. 12a articulation parts 150 enable the handle to extend across a top part of the push chair and are seen to be extended to maintain the handle in a generally open position. In FIG. 12b the articulation parts can be seen to be rotating the handle to a more compact arrangement as side handle pieces 154 are rotated inwards as shown in the figures. Also, the handle can be reduced in height. Upper handle arms 156 are arranged to be nested telescopically with lower handle arms 158 and so the upper part 156 will slide into the lower part 158 during the folding process. The reverse operation occurs during the unfolding. A number of different detailed schemes can be envisaged for arranging for the upper and lower parts to cooperate slidably to reduce the height of the handle assembly and latch in place in either or both of the upper and lower positions.

Latching arrangements can be incorporated to the handle assembly to ensure it remains in its folded or unfolded state.

FIG. 13 illustrates another alternative embodiment in which the V shaped chassis is replaced by a linear chassis having a single linear axis. This could make the gearing system simpler for a three legged variant and avoid the need for a universal swivel coupling in the chassis since a straight shaft could be used. In this illustration, the handle and seat assembly are not shown for convenience, but could be attached as illustrated in other embodiments. Whilst the figure only shows a three wheel chassis, it is readily apparent it could be easily adapted to a four wheel design. The forward extending legs would each be mounted on one of a pair of co-axial shafts and rearward extending legs would be mounted on the other of the co-axial shafts, the co-axial shafts connected together by gearing mechanisms of the type described above in order to ensure the legs rotate in opposite directions during a folding and unfolding operation. This configuration is particularly suited to an epicyclic type gearing system, which would permit a particularly compact design to be employed.

FIG. 14 shows the chassis of FIG. 13 folded to its compact dimensions. In order to ensure compact dimensions of a folded push chair, the rearward extending legs can be mounted on the chassis such that the plane of rotation of the legs is not perpendicular to the axis of the central axis 12a. If mounted in this manner, the legs do not extend perpendicularly from the axis 12 but are splayed outward at an angle to it so that in the extended position the track distance between the wheels is greater than the distance between the wheels when folded as can be seen in FIG. 13. When the legs are rotated and folded, as shown in FIG. 14, it can be seen the folded dimensions of the push chair are more compact than in the unfolded state.

In the embodiment of a straight central chassis, a universal coupling or other means to connect each arm of the "V" is not needed. A single main shaft could then be used extending across the width of the chassis with either both forward extending legs mounted securely on it, or both rearward extending legs securely mounted on it and the other of the two legs rotatably driven by the gear system described above to rotate in the opposite direction.

In further alternative examples of the present invention, it may be possible to have only one set of gears located in one part of the chassis and connected to the legs, the rotation of each of the legs being achieved by coupling each of two co-axial shafts to the appropriate wheel supporting leg.

In order for the push chair to be able to be folded in three dimensions, it is also desirable that the handle assembly can also be folded to be less wide than the push chair.

The invention claimed is:

1. A foldable push chair comprising a central body assembly extending across the push chair substantially horizontally and perpendicularly to the normal direction of travel of the push chair, a handle assembly connected to the central body and extending therefrom;
at least three wheel supporting legs rotatable around the central body and extending from the central body, in the unfolded state one or more wheel supporting legs extending in a forward direction from the central body and one or more wheel supporting legs extending in a rearward direction from the central body;
the one or more forward extending wheel supporting legs and the one or more rearward extending wheel supporting legs being coupled together such that they rotate in opposite directions around the central body during a folding or unfolding operation; in which the one or more forward extending wheel supporting legs and the one or more rearward extending wheel supporting legs are connected together by a gearing system.

2. The foldable push chair according to claim 1 in which the gearing system comprising spur gears mounted on a mainshaft, a countershaft, and an idler gear shaft.

3. The foldable push chair according to claim 1 in which the gearing system comprises an epicyclic gearing system.

4. The foldable push chair according to claim 1 where two of the at least three wheel supporting legs are rearward extending.

5. The foldable push chair according to claim 4 in which the rearward extending wheel supporting legs are mounted on the central body so that a plane of rotation around the central body is not perpendicular to the central body and is such that in the folded state, distal ends of the at least three wheel supporting legs are closer together than in the unfolded state.

6. The foldable push chair according to claim 4 in which the one or more forwardly extending wheel supporting legs are mounted on the central body so that a plane of rotation around the central body is not perpendicular to the central body and is such that in the folded state, distal ends of the at least three wheel supporting legs are closer together than in the unfolded state.

7. The foldable push chair according to claim 1 wherein either two forward extending legs or two rearward extending legs are securely mounted on a main shaft said legs being rotatable about the central body, the legs mounted on the main shaft rotating together in the same direction and the other of the rearward extending legs or forward extending legs being mounted on a second shaft coupled to the main shaft, the main shaft and the second shaft connected by gear means so that the forward extending legs and rearward extending legs rotate in opposite directions during a folding or unfolding operation.

8. The foldable push chair according to claim 7, having two forwardly extending legs and two rearwardly extending legs.

9. The foldable push chair according to claim 7 in which the central body is in a "V" shape, each arm of the V comprising a shaft supporting one forwardly and one rearwardly extending leg, the two shafts in the arms of the V being coupled together.

10. The foldable push chair according to claim 9 in which the shaft is articulated in a central region of the central body assembly, each arm of the shaft extending from the central region of the central body assembly to an outer part of the central body assembly and inclined to the horizontal to form a "V" shape, each arm supporting one forward and one rearward extending leg.

11. The foldable push chair according to claim 10 in which a connection between the shafts of each arm is by means of a universal joint.

12. The foldable push chair according to claim 10 in which a connection between the shafts of each arm is by means of a gearing system.

13. The foldable push chair according to claim 10 in which a connection between the shafts of each arm is by means of an elastomeric connector secured to each shaft.

14. The foldable push chair according to claim 10 in which a connection between the shafts of each arm is by means of a woven metal mesh of tubular construction secured to each shaft.

15. The foldable push chair according to claim 1, in which the central body comprises a substantially cylindrical chassis in which the one or more forward extending wheel supporting legs and the one or more rearward extending wheel supporting legs being coupled together such that they rotate in opposite directions around the cylindrical chassis during a folding or unfolding operation.

16. The foldable push chair according to claim 15, in which the cylindrical chassis has a cross-sectional diameter and the one or more forward extending wheel supporting legs and the one or more rearward extending wheel supporting legs are mounted on hubs within the central chassis, the hubs having the same cross-sectional diameter as the chassis.

17. A foldable push chair comprising a central body assembly extending across the push chair substantially horizontally and perpendicularly to the normal direction of travel of the push chair, a handle assembly connected to the central body and extending therefrom;
at least three wheel supporting legs rotatable around the central body and extending from the central body, in the unfolded state one or more wheel supporting legs extending in a forward direction from the central body and one or more wheel supporting legs extending in a rearward direction from the central body;
the one or more forward extending wheel supporting legs and the one or more rearward extending wheel supporting legs being coupled together such that they rotate in opposite directions around the central body during a folding or unfolding operation; in which the one or more forward extending wheel supporting legs and the one or more rearward extending wheel supporting legs are coupled together such that they rotate in opposite directions around the central body during a folding operation to a closed position adjacent the handle assembly of the pushchair; and in which the wheels are arranged to engage with a ground surface when in the open position and the one or more forward extending wheel supporting legs and the one or more rearward extending wheel supporting legs are coupled together to rotate upwards away from ground surface to the closed position.

18. The foldable push chair according to claim 17, where two of the at least three wheel supporting legs are rearward extending or where two of the at least three wheel supporting legs are forward extending.

19. The foldable push chair according to claim 17, in which the one or more rearward extending wheel supporting legs are mounted on the central body so that a plane of rotation around the central body is not perpendicular to the central body and is such that in the folded state, distal ends of the at least three wheel supporting legs are closer together than in the unfolded state.

20. The foldable push chair according to claim 17, in which the one or more forwardly extending wheel supporting legs are mounted on the central body so that a plane of rotation around the central body is not perpendicular to the central body and is such that in the folded state, distal ends of the at least three wheel supporting legs are closer together than in the unfolded state.

* * * * *